(12) United States Patent
Agarwal et al.

(10) Patent No.: US 8,135,828 B2
(45) Date of Patent: Mar. 13, 2012

(54) COOPERATIVE DIAGNOSIS OF WEB TRANSACTION FAILURES

(75) Inventors: Sharad Agarwal, Seattle, WA (US); Venkata N. Padmanabhan, Bangalore (IN); Prashanth Mohan, Chennai (IN); Nikitas Liogkas, Syosset, NY (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 12/394,926

(22) Filed: Feb. 27, 2009

(65) Prior Publication Data
US 2009/0161554 A1 Jun. 25, 2009

Related U.S. Application Data

(63) Continuation-in-part of application No. 11/079,792, filed on Mar. 14, 2005, now abandoned.

(51) Int. Cl.
*G06F 15/173* (2006.01)
(52) U.S. Cl. ........................................ 709/224; 709/219
(58) Field of Classification Search .................... 709/224
See application file for complete search history.

(56) References Cited

U.S. PATENT DOCUMENTS

| | | | | |
|---|---|---|---|---|
| 5,157,667 | A * | 10/1992 | Carusone et al. | 714/45 |
| 5,974,444 | A | 10/1999 | Konrad | |
| 6,320,865 | B1 | 11/2001 | Agrawala et al. | |
| 6,457,143 | B1 * | 9/2002 | Yue | 714/43 |
| 6,678,729 | B1 * | 1/2004 | Ahoor et al. | 709/224 |
| 6,785,259 | B2 | 8/2004 | Le et al. | |
| 6,956,820 | B2 | 10/2005 | Zhu et al. | |
| 7,072,958 | B2 | 7/2006 | Parmar et al. | |
| 2004/0044765 | A1 * | 3/2004 | Meek et al. | 709/224 |
| 2005/0120109 | A1 | 6/2005 | Delic et al. | |
| 2006/0203739 | A1 | 9/2006 | Padmanabhan et al. | |
| 2007/0283042 | A1 * | 12/2007 | West et al. | 709/238 |
| 2008/0126534 | A1 * | 5/2008 | Mueller et al. | 709/224 |
| 2009/0089112 | A1 * | 4/2009 | Mullen et al. | 705/7 |

OTHER PUBLICATIONS

"GIGRIB > How it works". Pingdom AB. Archived by the Internet Archive on Jan. 3, 2008: <http://replay.waybackmachine.org/20080103005337/uptime.pingdom.com/general/methodology>. pp. 1-4.*
"What is Pingdom GIGRIB?" Pingdom AB. Archived by the Internet Archive on Jan. 12, 2008: <http://replay.waybackmachine.org/20080112112147/uptime.pingdom.com>. pp. 1-2.*
"GIGRIB > FAQ". Pingdom AB. Archived by the Internet Archive on Jan. 16, 2008: <http://replay.waybackmachine.org/20080116005845/uptime.pingdom.com/general/faq>. pp. 1-3.*
"GIGRIB > About Pingdom GIGRIB". Pingdom AB. Archived by the Internet Archive on Jan. 12, 2008: <http://replay.waybackmachine.org/20080112112148/uptime.pingdom.com/general/what__is>. pp. 1-2.*
Caceres et al., "Multicast-Based Inference of Network-Internal Loss Characteristics", IEEE Transactions on Information Theory, Nov. 1999, pp. 1-35.

(Continued)

*Primary Examiner* — Christopher Biagini
(74) *Attorney, Agent, or Firm* — Wolf, Greenfield & Sacks, P.C.

(57) ABSTRACT

A client-based collaborative approach called WebProfiler is used for diagnosing Web transaction failures. The WebProfiler leverages end-host cooperation to pool together observations on the success or failure of Web transactions from multiple vantage points. These observations are utilized by a collaborative blame attribution algorithm to identify a suspect network entity that caused the Web transaction failure.

14 Claims, 19 Drawing Sheets

OTHER PUBLICATIONS

Clark et al., "A Knowledge Plane for the Internet", SIGCOMM, Aug. 2003, pp. 3-10.
Feldman et al., "Deriving Traffic Demands for Operations IP Networks: Methodology and Experience", In SIGCOMM, 2001, 14 pages.
Gibbons et al., "Iris Net: An Architecture for a World-Wide Sensor Web", IEEE Pervasive Computing, Oct. 2003, pp. 22-33.
Harvey et al., "SkipNet: A Scalable Overlay Network with Practical Locality Properties", In Fourth USENIX Symposium on Internet Technologies and Systems, 2003, pp. 1-14.
Huebsch et al., "Querying the Internet with PIER", In VLDB, 2003, 12 pages.
Mahajan et al., "User-Level Internet Path Diagnosis", In Proc. ACM Symposium on Operating Systems Principles, Oct. 2003, 14 pages.
Przydatek et al., "SIA: Secure Information Aggregation in Sensor Networks", SenSys '03, Nov. 2003, 11 pages.
Reiter et al., "Crowds: Anonymity for Web Transactions", in ACM Transactions on Information and System Security, 1(1):66-92, 1998, 23 pages.
Seshan et al., "Spand: Shared Passive Network Performance Discovery", In Proceedings of the 1st Usenix Symposium on Internet Technologies and Systems, in USIT '97, 13 pages.
Van Renesse et al., "Astrolabe: A Robust and Scalable Technology for Distributed System Monitoring, Management and Data Mining", ACM Transactions on Computer Systems, vol. 21, No. 2, May 2003, pp. 164-206.
Wang et al., "Automatic Mis-configuration Troubleshooting with Peer Pressure", In OSDI, Dec. 2004, 13 pages.
Wang et al., "STRIDER: A Black-box, State Based Approach to Change and Configuration Management and Support", In Usenix LISA XVII, Oct. 2003, pp. 165-177.
Wawrzoniak, "Sophia: An Information Plane for Networked Systems", In HotNets, Nov. 2003, 8 pages.
Yalagandula, et al., "A Scalable Distributed Information Management System", In SIGCOMM, Aug. 2004, 12 pages.
Zhang et al., "PlanetSeer: Internet Path Failure Monitoring and Characterization in Wide-Area Services", 2004, 16 pages.
Zhang et al., "On the Characteristics and Origins of Internet Flow Rates", In SIGCOMM, Aug. 2002, 14 pages.
Adya et al., "Architecture and Techniques for Diagnosing Faults in IEEE 802.11 Infrastructure Networks", In MOBICOM, Sep. 2004, 15 pages.
Downey et al., "Using Pathchar to Estimate Internet Link Characteristics", In SIGCOMM, 1999, 10 pages.
Padmanabhan et al., "Server-Based Inference of Internet Link Lossiness", In INFOCOM, 2003 11 pages.
Paxson, V., "Automated Packet Trace Analysis of TCP Implementations", in SIGCOMM, Sep. 1997, 13 pages.
Rubenstein et al., "Detecting Shared Congestion of Flows Via End-toEnd Measurements", IEEE/ACM Transactions on Networking, vol. 10, No. 3, SIGMETRICS, Jun. 2000, pp. 381-395.
Agarwal et al., "WebProfiler: cooperative diagnosis of Web failures", Technical Report MSR-TR-2008-45, Oct. 2008, 25 pages, publicly available May 13, 2008, http://research.microsoft.com/apps/pubs/default.aspx?id=70562.
Stone, Brad, "As Web Traffic Grows, Crashes Take Bigger Toll", New York Times article, Jul. 6, 2008, 3 pages, http://www.nytimes.com/2008/07/06/technology/06outage.html?ref=technology.
Packet Design, Inc. (n.d.), *Packet Design*, Retrieved May 27, 2005 from http//www.packetdesign.com.
University of California, Berkeley (n.d.), *PlanetLab*, Retrieved May 27, 2005 from http://planetlab.millennium.berkeley.edu.
Chun, B. (n.d.), *Slice Statistics Sensor Survey*, Retrieved Jun. 1, 2005 from http://berkeley.intel-research.net/bnc/slicestat/.
Keynote Systems, Inc. (2005), *Internet Health Report*, Retrieved May 22, 2005 from http://scoreboard.keynote.com/scoreboard.Main.aspx?Login=Y&Useniame=public&Pass . . .
*Down for everyone or just me?* (n.d.), Retrieved Apr. 13, 2009 from http://downforeveryoneorjustme.com.
Pingdom AB (2008), *Pingdom Web site monitoring for 100% uptime. Measure your downtime*, Retrieved Apr. 13, 2009 from http://pingdom.com.
Pingdom AB (n.d.), *Overview: twitter.com/home*, Retrieved Apr. 13, 2009 from http://www.pingdom.com/reports/vb1395a6sww3/check_overview/?name=twiter.com%2Fhome.

* cited by examiner

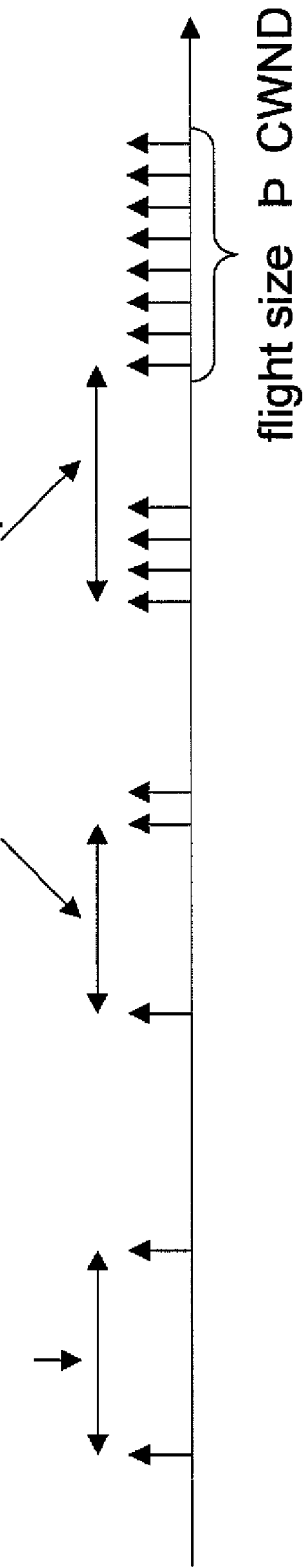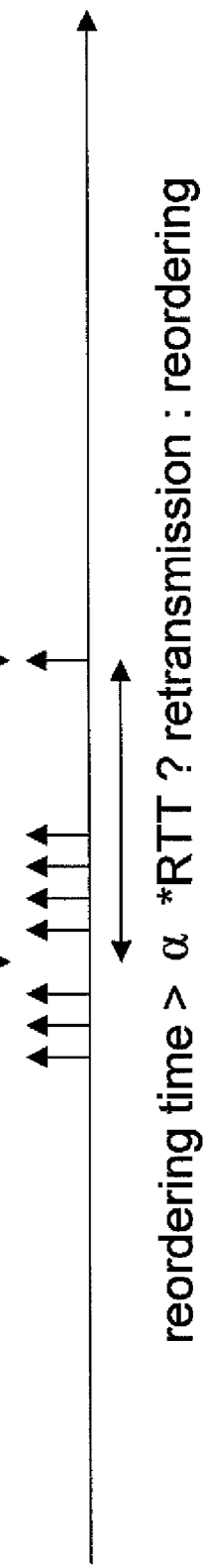
FIG. 5

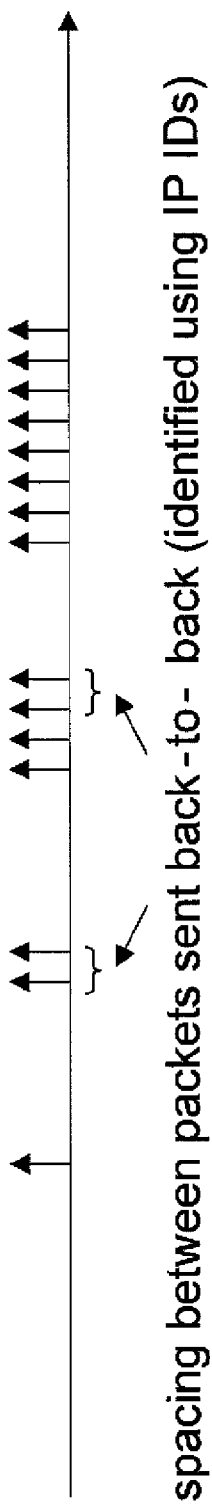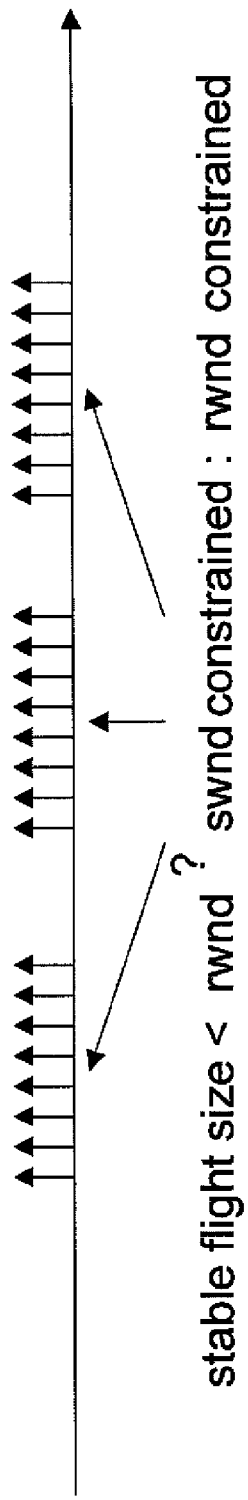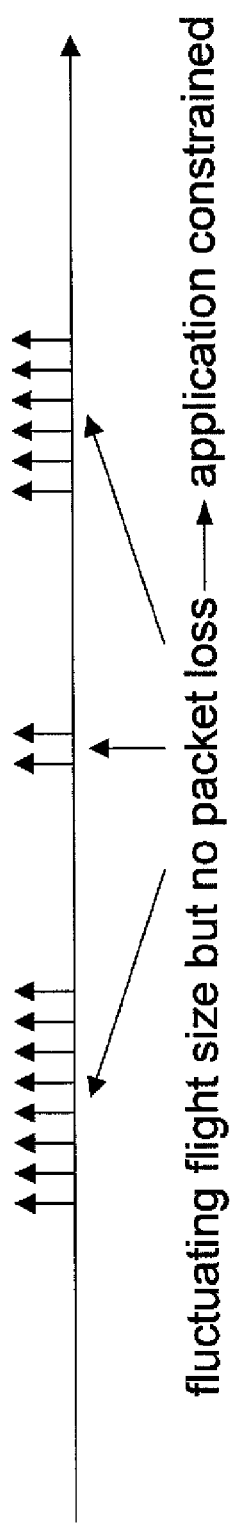
FIG. 6

```
// find list of suspects for failed Web transaction F
Diagnose Failure (F)
    // find entities with abnormally high blame scores
1.    create empty set of candidate suspects S
2.    for each entity (pair) $E_i$ involved in transaction F
3.        retrieve success and failure counts $S_i$ and $F_i$
4.        calculate blame score $B_i = F_i/(S_i + F_i)$
5.        retrieve distribution of blame scores $B_{dist}$ for
          all entities of the same functional type as $E_i$
6.        If $B_i$ is abornally high compared to $B_{dist}$,
7.            add $E_i$ to S
   // narrow down the list of candidate suspects S
8.    for each suspect $s_i$ in S
          // identify the largest superset(s) of entities
          // with abnormally high blame score(s)
9.        if $s_i$ is contained in another suspect $s_j$
10.           remove $s_i$ from S
11.   return S
```

FIG. 16

COOPERATIVE DIAGNOSIS OF WEB TRANSACTION FAILURES

CROSS REFERENCE TO RELATED APPLICATION

This application is a continuation-in-part of application Ser. No. 11/079,792, filed Mar. 14, 2005, which is hereby incorporated by reference in its entirety.

FIELD OF THE INVENTION

The invention relates generally to systems and methods that enable monitoring and diagnosing of computer network problems.

BACKGROUND OF THE INVENTION

In today's networks, network operators (e.g. ISPs, web service providers, etc.) have little direct visibility into a users' network experience at an end hosts of a network connection. Although network operators monitor network routers and links, the information gathered from such monitoring does not translate into direct knowledge of the end-to-end health of a network connection.

For network operators, known techniques of analysis and diagnosis involving network topography leverage information from multiple IP-level paths to infer network health. These techniques typically rely on active probing and they focus on a server-based "tree" view of the network rather than on the more realistic client-based "mesh" view of the network.

Some network diagnosis systems such as PlanetSeer are server-based systems that focus on just the IP-level path to locate Internet faults by selectively invoking active probing from multiple vantage points in a network. Because these systems are server-based, the direction of the active probing is the same as the dominant direction of data flow. Other tools such as NetFlow and Route Explorer enable network administrators to passively monitor network elements such as routers. However, these tools do not directly provide information on the end-to-end health of the network.

On the other hand, users at end hosts of a network connection usually have little information about or control over the components (such as routers, proxies, and firewalls) along end-to-end paths of network connections. As a result, these end-host users typically do not know the causes of problems they encounter or whether the cause is affecting other users as well.

There are tools users employ to investigate network problems. These tools (e.g., Ping, Traceroute, Pathchar, Tulip) typically trace the paths taken by packets to a destination. They are mostly used to debug routing problems between end hosts in the network connection. However, many of these tools only capture information from the viewpoint of a single end host or network entity, which limits their ability to diagnose problems. Also, these tools only focus on entities such as routers and links that are on the IP-level path, whereas the actual cause of a problem might be higher-level entities such as proxies and servers. Also, these tools actively probe the network, generating additional traffic that is substantial when these tools are employed by a large number of users on a routine basis.

Reliance of these user tools on active probing of network connections is problematic for several reasons. First, the overhead of active probing is often high, especially if large numbers of end hosts are using active probing on a routine basis. Second, active probing does not always pinpoint the cause of failure. For example, an incomplete tracing of the path of packets in a network connection may be due to router or server failures, or alternatively could be caused simply by the suppression by a router or a firewall of a control and error-reporting message such as those provided by the Internet Control Message Protocol (ICMP). Third, the detailed information obtained by client-based active probing (e.g., a route tracer) may not pertain to the dominant direction of data transfer, which is typically from the server to the client.

Thus, there is a need for strategies to monitor and diagnose network so problems from the viewpoint of end hosts in communications paths that do not rely on active probing.

SUMMARY OF THE INVENTION

In some embodiments, passive observations of existing end-to-end transactions are gathered from multiple vantage points, correlated and then analyzed to diagnose problems. Information is collected that relates to both performance and reliability. For example, information describing the performance of the connection includes both the speed of the connection and information about the failure of the connection. Reliability information is collected across several connections, but it may include the same type of data such as speed and the history of session failures with particular network resources.

Both short-term and long-term network problems can be diagnosed.

Short term problems are communications problems likely to be peculiar to the communications session, such as slow download times or inability to download from a website. Long term network problems are communications problems that span communications sessions and connections and are likely associated with chronic infrastructure competency such as poor ISP connections to the Internet. Users can compare their long-term network performance, which helps drive decisions such as complaining to the ISP, upgrading to a better level of service, or even switching to a different ISP that appears to be proving better service. For example, a user who is unable to access a website can mine collected and correlated information in order to determine whether the problem sources from his/her site or Internet Service Provider (ISP), or from the website server. In the latter case, the user then knows that switching to a mirror site or replica of the site may improve performance (e.g., speed) or solve the problem (e.g., failure of a download).

Passive observations can be made at end hosts of end-to-end transactions and shared with other end hosts in the network, either via an infrastructural service or via peer-to-peer communications techniques. This shared information can be aggregated at various levels of granularity and correlated by attributes to provide a database from which analysis and diagnoses are made concerning the performance of the node in the network. For example, a user of a client machine at an end host of the network uses the aggregated and correlated information to benchmark the long-term network performance at the host node against that of other client machines at other host nodes of the network located in the same city. The user of the client machine then uses the analysis of the long-term network performance to drive decisions such as upgrading to a higher level of service (e.g., to 768 Kbps DSL from 128 Kbps service) or switching ISPs.

Commercial endpoints in the network such as consumer ISPs (e.g., America On Line and the Microsoft Network) can also take advantage of the shared information. The ISP may monitor the performance seen by its customers (the end hosts described above) in various locations and identify, for instance, that customers in city X are consistently under performing those elsewhere. The ISP then upgrades the service or switches to a different provider of modem banks, backhaul links and the like in city X in order to improve customer service.

Monitoring ordinary communications allows for "passive" monitoring and collection of information, rather than requiring client machines to initiate communications especially intended for collecting information from which performance evaluations are made. In this regard, the passive collection of information allows for the continuous collection of information without interfering with the normal uses of the end hosts. This continuous monitoring better enables historical information to be tracked and employed for comparing with instant information to detect anomalies in performance.

Collected information can be shared among the end hosts in several ways. For example, in one embodiment, a peer-to-peer infrastructure in the network environment allows for the sharing of information offering different perspectives into the network. Each peer in a peer-to-peer network is valuable, not because of the resources such as bandwidth that it brings to bear but simply because of the unique perspective it provides on the health of the network. The greater the number of nodes participating in the peer-to-peer sharing of information collected from the passive monitoring of network communications, the greater number of perspectives into the performance of the network, which in turn is more likely to provide an accurate description of the network's performance. Instead of distributing the collected information in a peer-to-peer network, information can be collected and centralized at a server location and re-distributed to participating end hosts in a client-server scheme. In either case, the quality of the analysis of the collected information is dependent upon the number of end hosts participating in sharing information since the greater the number of viewpoints into the network, the better the reliability of the analysis.

Participation in the information sharing scheme of the invention occurs in several different ways. The infrastructure for supporting the sharing of collected information is deployed either in a coordinated manner by a network operator such as a consumer ISP or the IT department of an enterprise, or it grows on an ad hoc basis as an increasing number of users install software for implementing cooperative diagnosis on their end-host machines.

In further embodiments, a client-based collaborative approach called WebProfiler is used for diagnosing Web transaction failures. The WebProfiler leverages end-host cooperation to pool together observations on the success or failure of Web transactions from multiple vantage points. These observations are utilized by a collaborative blame attribution algorithm to identify a suspect network entity that caused the Web transaction failure.

According to an aspect of the invention, a method is provided for analyzing Web transaction failures in a network including a plurality of clients. The method comprises: monitoring Web transactions at a client computing device to obtain Web transaction information; recording the Web transaction information in a repository that is available for recording of Web transaction information by the plurality of clients; querying the repository to obtain selected Web transaction information recorded by some or all of the plurality of clients; and analyzing the selected Web transaction information recorded by some or all of the plurality of clients to determine at least one suspect network entity that caused the Web transaction failure.

According to another aspect of the invention, a method is provided for diagnosing a cause of a Web transaction failure. The method comprises: for each network entity involved in the Web transaction failure, retrieving a success count and a failure count; calculating a blame score as a ratio of the failure count to the sum of the success count and the failure count for each network entity involved in the Web transaction failure; determining if the blame score for each network entity involved in the Web transaction failure is abnormally high; and if the blame score for a network entity is abnormally high, adding the network entity to a set of suspects that caused the Web transaction failure.

According to a further aspect of the invention, a computing device comprises: a processor including: a Web browser to perform Web transactions in response to user requests; a Web browser monitor to monitor Web transactions performed by the Web browser and to obtain Web transaction information representative of the Web transactions; a WebProfiler service to record Web transaction information in a repository that is available for recording of Web transaction information by a plurality of Web clients; and a WebProfiler diagnosis module to query the repository to obtain selected Web transaction information recorded by some or all of the plurality of Web clients and to analyze the selected Web transaction information to determine at least one suspect network entity that caused the Web transaction failure; and a storage device to store local Web transaction information.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 5 illustrates signal flow at the TCP level sensed by one of the sensors at an end host that determines round trip times (RTTs) for server-client communications;

FIG. 6 illustrates signal flow at the TCP level sensed by one of the sensors at an end host that identifies sources of speed constraints on communications between an end host and a server;

FIG. 16 shows pseudo code for a diagnosis algorithm in accordance with an embodiment of the invention;

DETAILED DESCRIPTION

Figure 1:
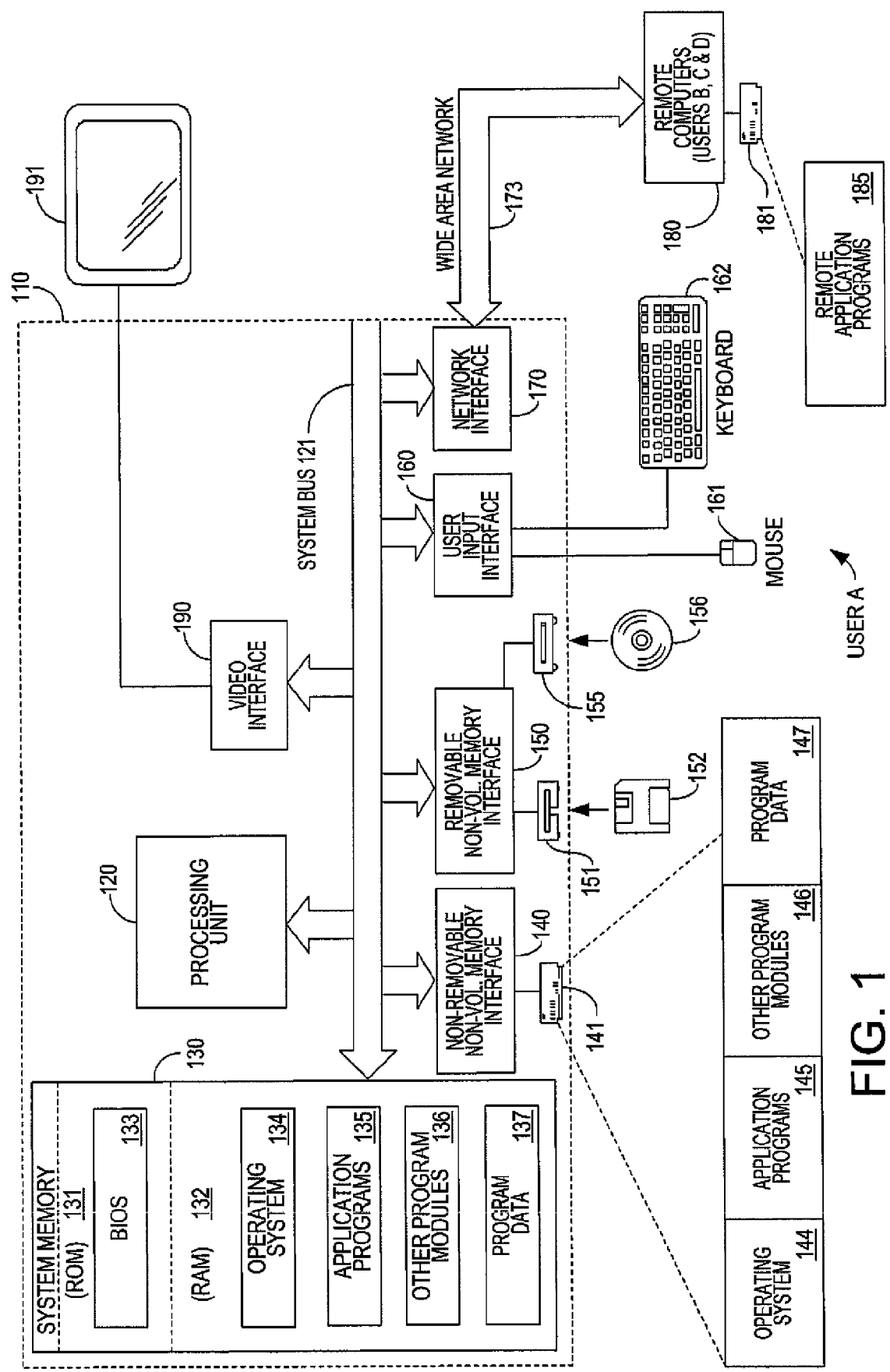
FIG. 1 is a block diagram generally illustrating an exemplary computer system of an end host in which the invention is realized.

Turning to the drawings, wherein like reference numerals refer to like elements, the invention is illustrated as implemented in a suitable computer networking environment. The networking environment is preferably a wide area network such as the Internet. In order for information to be shared among host nodes, the network environment includes an infrastructure for supporting the sharing of information among the end hosts. In the illustrated embodiment described below, a peer-to-peer infrastructure is described. However, other infrastructures could be employed as alternatives—e.g., a server-based system that aggregates data from different end hosts in keeping with the invention. In the simplest implementation, all of the aggregated information is maintained at one server. For larger systems, however, multiple servers in a communications network would be required.

FIG. 1 illustrates an exemplary embodiment of a end host that implements the invention by executing computer-executable instructions in program modules 136. In FIG. 1, the personal computer is labeled "USER A."

Generally, the program modules 136 include routines, programs, objects, components, data structures and the like that perform particular tasks or implement particular abstract data types. Alternative environments include distributed computing environments where tasks are performed by remote processing devices linked through a wide area network (WAN) such as illustrated in FIG. 1. In a distributed computing environment, program modules 136 may be located in both the memory storage devices of the local machine (USER A) and the memory storage devices of remote computers (USERS B, C, D).

The end host can be a personal computer or numerous other general purpose or special purpose computing system environments or configurations. Examples of suitable computing systems, environments, and/or configurations include, but are not limited to, personal computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2B:
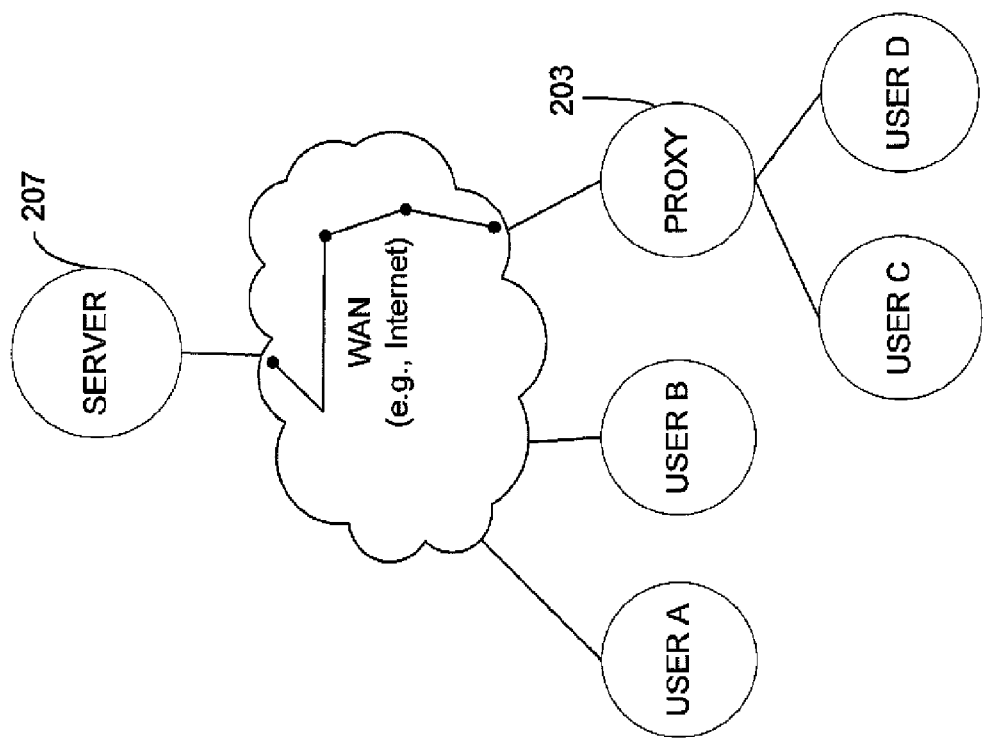
FIGS. 2a and 2b are schematic illustrations of alternative network environments.
Figure 2A:
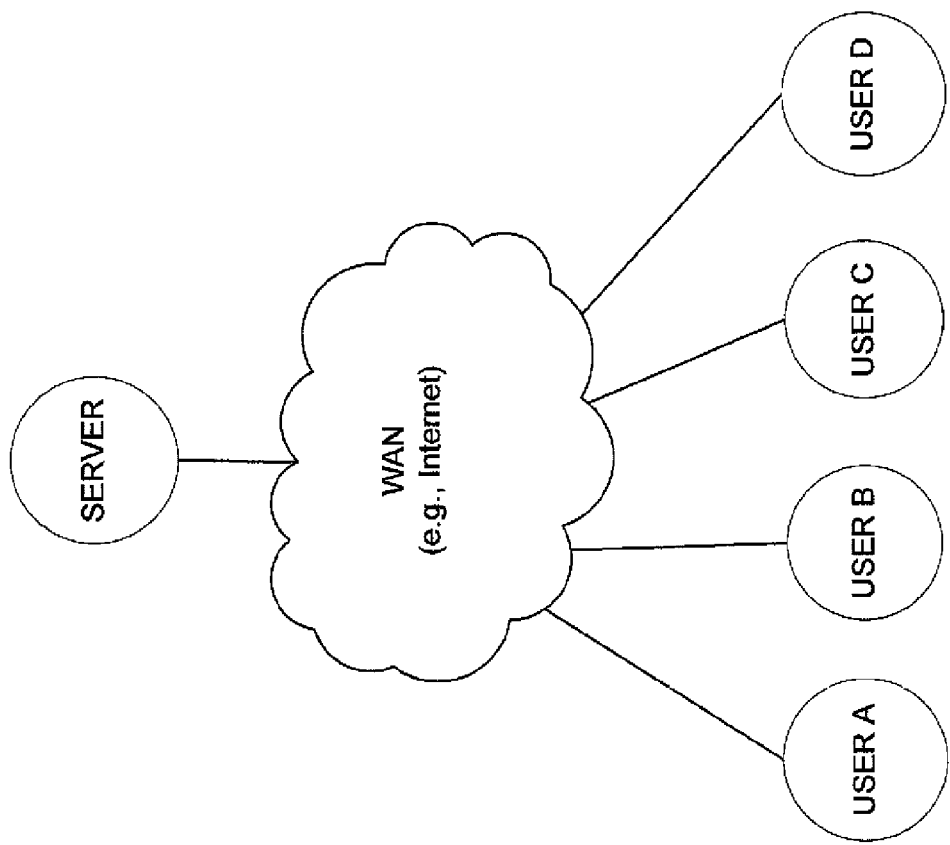

Referring to FIGS. 2a and 2b, USERS A, B, C and D are end hosts in a public or private WAN such as the Internet. The USERS A, B, C and D communicate with nodes in the network such as the server illustrated in FIGS. 2a and 2b. The USERS may be either directly coupled into the WAN through an is ISP as illustrated in FIG. 2a or the USERS can be interconnected in a subnet (e.g., a corporate LAN) and connected to the WAN through a proxy as illustrated in FIG. 2b.

In either of the environments of FIG. 2a or 2b, a communications infrastructure in the WAN environment enables the USERS A, B, C, and D to share information. In the embodiment described herein, the infrastructure is a peer-to-peer network, but it could alternatively be a server-based infrastructure.

In either case, at each of the USERS A, B, C and D, an application program 135 running in memory 132 passively collects data derived from monitoring the activity of other application programs 135 and stores the data as program data 137 in memory 130. Historical data is maintained as program data 147 in non-volatile memory 140. The monitoring program simply listens to network communications generated during the course of the client's normal workload. The collected data is processed and correlated with attributes of the client machine in order to provide contextual information describing the performance of the machine during network communications. This performance information is shared with other end hosts in the network (e.g., USERS B, C and D) in a manner in keeping with either a peer-to-peer or server-based infrastructure to which the USERS A, B, C and D belong. In a peer-to-peer infrastructure, order to manage the distribution of the performance information among the participating nodes, distributed hash tables (DHTs) manage the information at each of the USERS A, B, C and D.

The exemplary system for one of the USERS A, B, C or D in FIG. 1 includes a general-purpose computing device in the form of a computer 110. Components of computer 110 include, but are not limited to, a processing unit 120, a system memory 130, and a system bus 140 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes nonvolatile memory such as read only memory (ROM) 131 and volatile memory such as random access memory (RAM) 132. A basic input/output system 133 (BIOS), containing the basic routines that help to transfer information between elements within computer 110, such as during start-up, is typically stored in ROM 131. RAM 132 typically contains data and/or program modules such as those described hereinafter that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. For example, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers hereto to illustrate that, at a minimum, they are different copies. A USER may enter commands and information into the computer 110 through input devices such as a keyboard 162 and pointing device 161, commonly referred to as a mouse, trackball or touch pad. These and other input devices are often connected to the processing unit 120 through a USER input interface 160 coupled to the system bus, but may be connected by other interface and bus structures, such as a parallel port, game port or a universal serial bus (USB). A monitor 191 or other type of display device is also connected to the system bus 121 via an interface, such as a video interface 190.

The computer 110 operates in a networked environment using logical connections to one or more remote computers, such as a remote computer 180 (e.g., one of USERS B, C or D). The remote computer 180 is a peer device and may be another personal computer and typically includes many or all of the elements described above relative to the personal computer 110, although only a memory storage device 181 has been illustrated in FIG. 1. The logical connections depicted in FIG. 1 include the wide area network (WAN) 173 in keeping with the invention, but may also include other networks such as a local area network if the computer 110 is part of a subnet as illustrated in FIG. 2b for USERS C and D. Such networking environments are commonplace in offices, enterprise-wide computer networks, intranets and the Internet.

The personal computer 110 is connected to the WAN 173 through a network interface or adapter 170. In a peer-to-peer environment, program modules at each of the USERS A, B, C and D implement the peer-to-peer environment. FIG. 1 illustrates remote application programs 185 as residing on memory device 181 of the remote computer B, C or D.

There are several aspects of the invention described in detail hereinafter and organized as follows: First, data is collected at user nodes of a network. The data records network activity from the perspective of the user machines. Second, the data is then normalized so it can be shared with other user nodes. Each node participating in the system collects information from other nodes, giving each node many perspectives into the network. In order to compare the data from different nodes, however, it first must be converted to a common framework so that the comparisons have a context. Third, the collected data from different user nodes is aggregated based on attributes assigned to the user nodes (e.g., geography, network topology, destination of message packets and user bandwidth).

With the data collected and organized, each end host instantiates a process for analyzing the quality of its own communications by comparing data from similar communications shared by other end hosts. The process for analysis has different aspects and enables different types of diagnoses.

I. Data Acquisition

Sensors perform the task of acquiring data at each USER node A, B, C and D participating in the information-sharing infrastructure of the invention. Each of the sensors is preferably one of the program modules 136 in FIG. 1. These sensors are primarily intended to passively observe existing network traffic; however, the sensors are also intended to be able to generate test messages and observing their behavior (i.e., active monitoring of performance). Each of the USERS A, B, C and D typically has multiple sensors—e.g., one for each network protocol or application. Specifically, sensors are defined for each of the common Internet protocols such as TCP, HTTP, DNS, and RTP/RTCP as well protocols that are likely to be of interest in specific settings such as enterprise networks (e.g., the RFC protocol used by Microsoft Exchange servers and clients). The sensors characterize the end-to-end communication (success/failure, performance, etc.) as well as infer the conditions on the network path.

A. Examples of Sensors for Data Acquisition

By way of example, two simple sensors are described hereafter to analyze communications between nodes in a network at the TCP and HTTP levels. These sensors are generally implemented as software devices and thus they are separately depicted in the hardware diagram of FIG. 1. Moreover, in the illustrated embodiment of the drawings FIGS. 1-13, two specific sensors are illustrated and described hereinafter in detail. However, many different types of sensors may be employed in keeping with the invention, depending on the specific network environment and the type of information desired to be collected. The widespread use of TCP and HTTP protocols, however, makes the two sensors described hereinafter particularly useful for analyzing node and network performance. Nevertheless, a third generic sensor is illustrated in FIG. 3 to ensure an understanding that the type of sensor incorporated into the invention is of secondary importance to collecting information of a type that is usable in a diagnosis.

TCP Sensor

Figure 3:
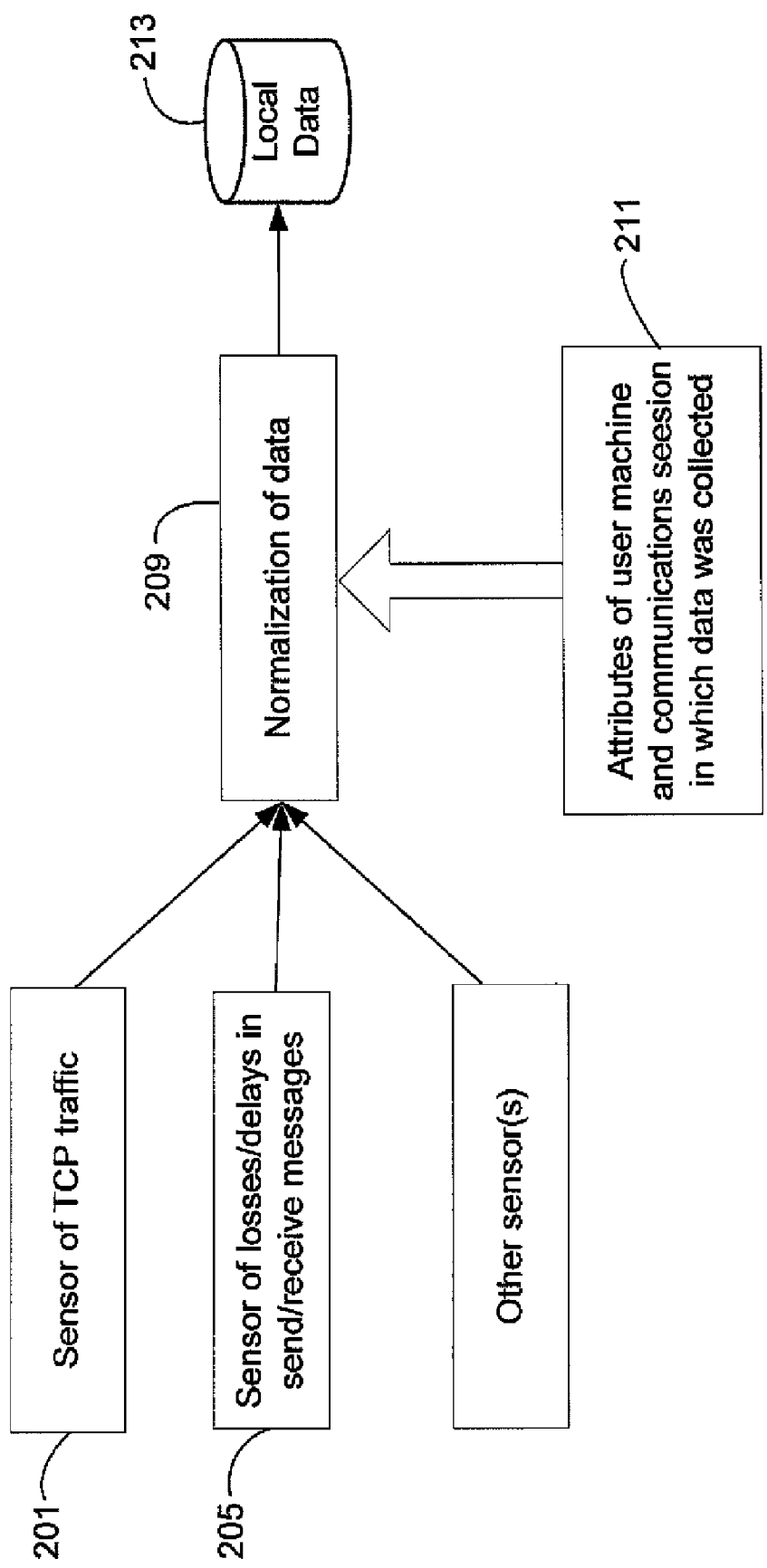
FIG. 3 is a block diagram illustrating the process of collecting information at each of the end hosts participating in the sharing of information.

A TCP sensor 201 in FIG. 3 is a passive sensor that listens on TCP transfers to and from the end host (USER A in FIG. 1), and attempts to determine the cause of any performance problems. In a Microsoft Windows XP® operating system environment, for example, it operates at a user level in conjunction with the NetMon or WinDump filter driver. Assuming the USER's machine is at the receiving end of TCP connections, the following is a set of heuristics implemented by the sensor 201.

Figure 4:
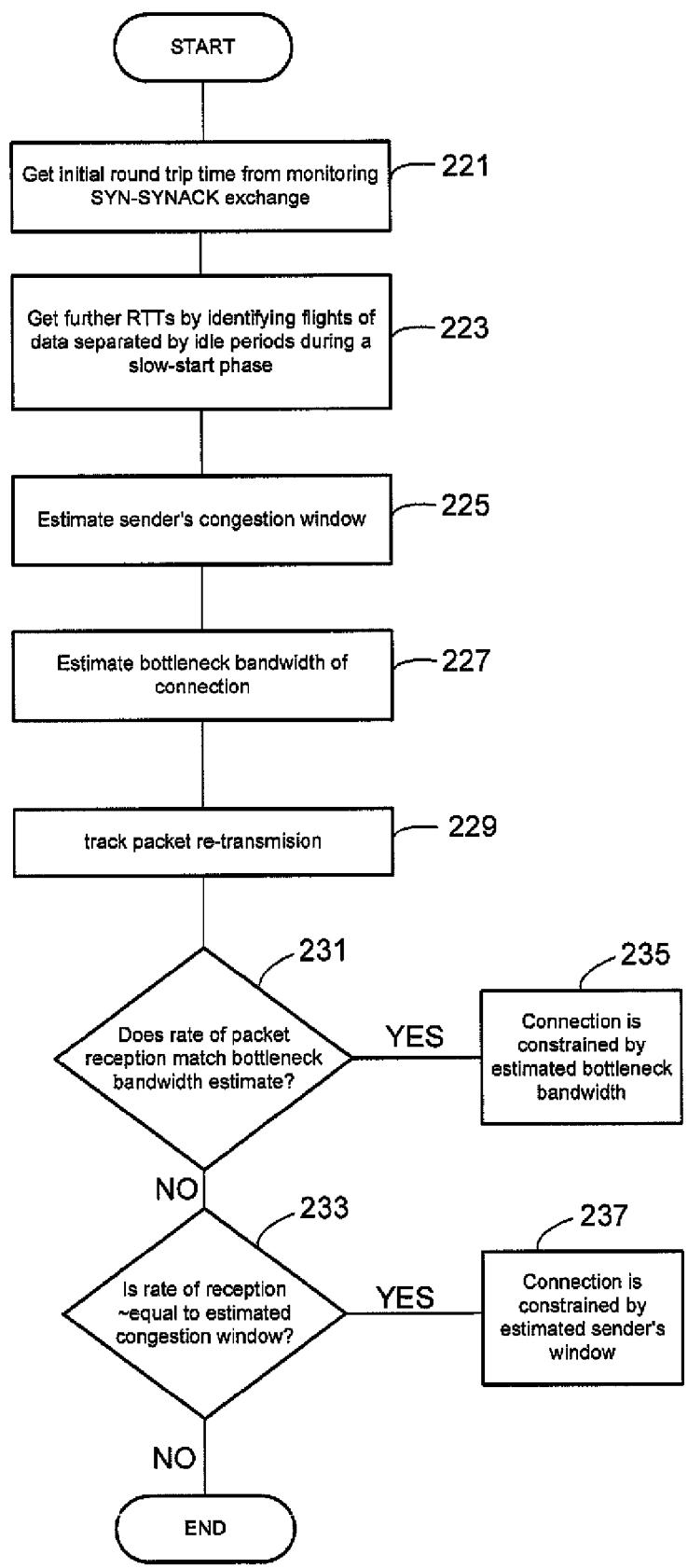
FIG. 4 is a flow diagram of the sensing function provided by one of the sensors at an end host that allows for the collection of performance information.

Referring to the flow diagram of FIG. 4, in step 221 an initial round trip time (RTT) sample is obtained from a SYN-SYNACK exchange between the USER and the server (FIG. 2a) as illustrated in the timeline of packet flows in FIG. 5. In step 223 of the flow diagram of FIG. 4, further RTT samples are obtained by identifying flights of data separated by idle periods during a TCP slow-start phase as suggested by the timeline of packet flows in FIG. 5. In step 225 of FIG. 4, the size of a sender's TCP congestion window is estimated based on the RTTs. In step 227, the TCP sensor 201 makes a rough estimate of the bottleneck bandwidth (the lowest bandwidth in the path of a connection) by observing the spacing between the pairs of back-to-back packets emitted during TCP slow start as illustrated in the timeline of FIG. 6, which can be identified by checking if the IP IDs are in sequence. In step 229, the TCP sensor 201 senses retransmission of data and the delay caused by the retransmission. The lower timeline in FIG. 5 illustrates measurement of a delay when a packet is received out-of-sequence. Either because of the packet being retransmitted or because the packet experienced an abnormally long transmission delay relative to the other packets.

By the TCP sensor 201 estimating the RTTs, the size of the congestion window and the bottleneck bandwidth, the cause of rate limitation is determined in steps 231 and 233 in the flow diagram of FIG. 4. If the delay matches to the bottleneck bandwidth, then the sensor 201 indicates the connection speed of the monitored communication is constrained by the bottleneck bandwidth in step 235. However, if the delay does not match to the bottleneck bandwidth, the sensor 201 then looks at step 237 to see if the delay matches to the congestion window estimated from the RTTs.

Web Sensor

In certain settings such as enterprise networks, a USER's web connections may traverse a caching proxy as illustrated in FIG. 2b. In such situations, the TCP sensor 201 only observes the dynamics of the network path between a proxy 203 and the USER in a connection or communications session (e.g., USER C in FIG. 2b). Another sensor 205 in FIG. 3, herein called a WEB sensor, provides visibility into the conditions of the network path beyond the proxy 203. For an end-to-end web transaction, the WEB sensor 205 estimates the contributions of the proxy 203, a server 207, and the server-proxy and proxy-client network paths to the overall latency. The WEB sensor 205 decomposes the end-to-end latency by using a combination of cache-busting and byte-range requests. Some of the heuristics used by the WEB sensor 205 are outlined in the flow diagram of FIG. 7 and the schematic diagram of FIG. 8.

In general, the elapsed time between the receipt of the first and last bytes of a packet indicates the delay in transmission between the proxy 203 and the client (e.g., USER C), which in general is affected by both the network path and the proxy itself. For cacheable requests, the difference between the request-response latency (until the first byte of the response) and the SYN-SYNACK RTT indicates the delay due to the proxy itself (See diagram a in FIG. 8).

$$RTT_{APP} - RTT_{SYN} \Longrightarrow \text{Proxy Delay}$$

Figure 7:
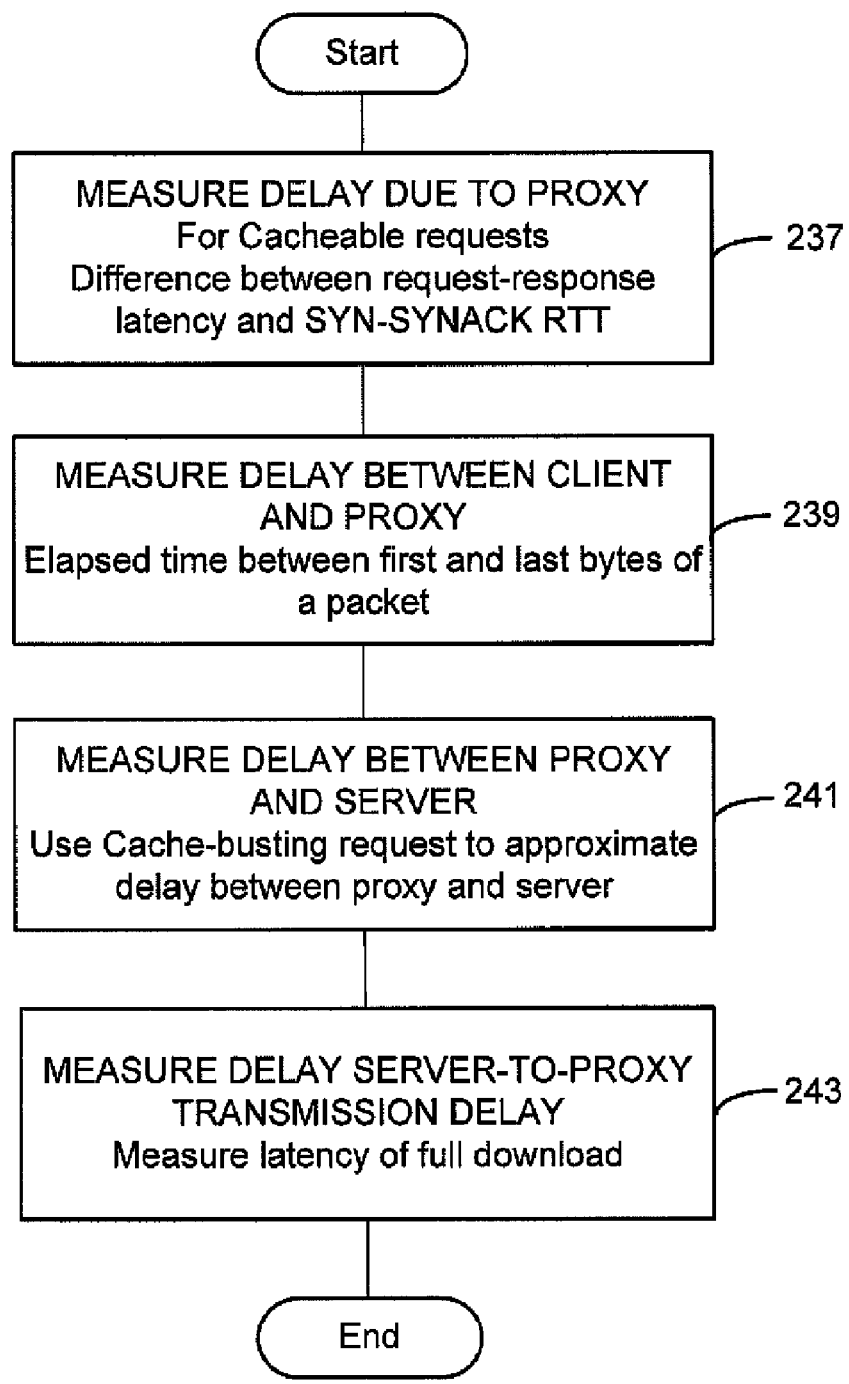
FIG. 7 is a flow diagram of the sensing function provided by a sensor at an end host that allows for the collection of performance information in addition to that provided by the sensor of FIG. 4.

In this regard, the flow diagram of FIG. 7 illustrates the first step 237 of the WEB sensor 205 to measure the transmission delay due to the proxy. In step 239 in FIG. 7, the WEB sensor 205 determines the delay between a USER and the proxy 203 by measuring the elapsed time between the first and last bytes of a transmission.

Next, in order to measure the delay between the proxy 203 and the server 207 (see FIG. 2b), the WEB sensor 205 operates in a pseudo passive mode in step 241 in order to create a large enough request to "bust" through the cache at the proxy 203, thereby eliminating it as a factor in any measured delay. Specifically, the WEB sensor 205 operates by manipulating the cache control and byte-range headers on existing HTTP requests. Thus, the response time for a cache-busting one-byte byte-range request indicates the additional delay due to the proxy-to-server portion of the communication path. In the last step 243 in FIG. 7, the WEB sensor 205 measures the delay of a full download to the client from the server.

The WEB sensor 205 produces less detailed information than the TCP sensor 201 but nevertheless offers a rough indication of the performance of each segment in the client-proxy-server path. The WEB sensor 205 ignores additional proxies, if any, between the first-level proxy 203 and the origin server 207 (See FIG. 2b), which is acceptable since such proxies are typically not visible to the client (e.g., USER C) and thus the client does not have the option of picking between multiple alternative proxies.

II. Data Normalization

Referring again to FIG. 3, data produced by the sensors 201 and 205 at each node (e.g., USERS A, B, C, and D) is normalized before it is shared with other nodes. The normalization enables shared data to be compared in a meaningful way by accounting for differences among nodes in the collected data. The normalization 209 in FIG. 3 relies on attributes 211 of the network connection at the USER and attributes of the USER's machine itself. For example, the throughput observed by a dialup USER is likely to be consistently lower than the throughput observed by a LAN USER at the same location. Comparison of raw data shared between the two USERS suggests an anomaly, but there is no anomaly when the difference in the connections is taken into account. In contrast, failure to download a web page or a file is information that can be shared without adjustment for local attributes such as the speed of a USER's web access link.

In order to provide meaningful comparisons among diverse USERS, the USERS are divided into a few different bandwidth classes based on the speed of their access link (downlink)—e.g., dialup, low-end broadband (under 250 Kbps), high-end broadband (under 1.5 Mbps) and LAN (10 Mbps and above). USERS determine their bandwidth class either based on the estimates provided by the TCP sensor 201 or based on out-of-band information (e.g., user knowledge).

The bandwidth class of a USER node is included in its set of attributes 211 for the purposes of aggregating certain kinds of information into a local database 213, using the procedure discussed below, Information of this kind includes the TCP throughput and possibly also the RTT and the packet loss rate. For TCP throughput, information inferred by the TCP sensor 201 filters out measurements that are limited by factors such as the receiver-advertised window or the connection length. Regarding the latter, the throughput corresponding to the largest window (i.e., flight) that experienced no loss is likely to be more meaningful than the throughput of the entire connection.

In addition to network connection attributes for normalizing shared information, certain other information collected at the local data store 213 (e.g., RTT) is strongly influenced by the location of the USER. Thus, the RTT information is normalized by including with it information regarding the location of the USER so, when the information is shared, it can be evaluated to determine whether a comparison is meaningful (e.g., are the RTTs measured from USERS in the same general area such as in the same metropolitan area).

Certain other information can be aggregated across all USERS regardless of their location or access link speed. Examples include the success or failure of page downloads and server or proxy loads as discerned from the TCP sensor or the WEB sensor.

Finally, certain sites may have multiple replicas and USERS visiting the same site may in fact be communicating with different replicas in different parts of the network. In order to account for these differences, information is collected on a per replica basis and also collected on a per-site basis (e.g., just an indication of download success or failure). The latter information enables clients connected to a poorly performing replica to discover that the site is accessible via other replicas.

III. Data Aggregation

Figure 8:
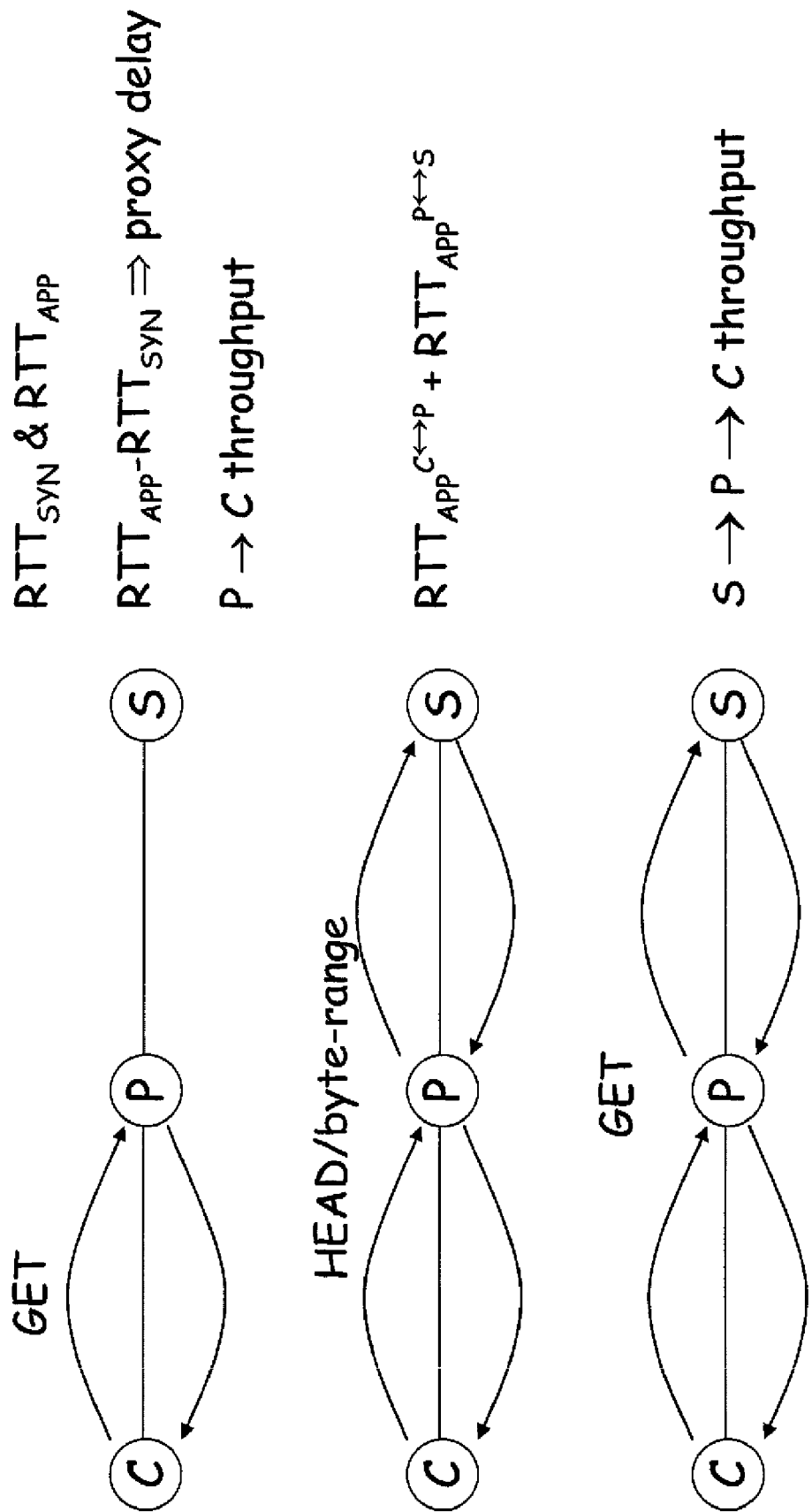
FIG. 8 illustrates a technique for estimating round trip times (RTTs) in a network architecture such as illustrated in FIG. 2b and implemented in the flow diagram of FIG. 7, wherein a proxy server is interposed in communications between an end host and a server.

Performance information gathered at individual nodes is shared and aggregated across nodes as suggested by the illustration in FIG. 8. Preferably, a decentralized peer-to-peer architecture is employed, which spreads the burden of aggregating information across all USER nodes.

The process of aggregating information at nodes is based on the set of USER attributes 211. For both fault isolation and comparative analysis for example, performance information collected at the local data store 213 of each USER node is shared and compared among USERS having common attributes or attributes that, if different, complement one another in a manner useful to the analysis of the aggregated information. Some USER attributes of relevance are given below.

A. Geographical Location

Aggregation of information at a USER node based on location is useful for end host and network operators to detect performance trends specific to a particular location. For example, information may be aggregated at a USER node for all users in the Seattle metropolitan area as suggested by the diagram in FIG. 8. However, the information from the USERS in the Seattle area may not be particularly informative to USERS in the Chicago area. Thus, as illustrated in FIG. 8, there is a natural hierarchal structure to the aggregation of information by location—i.e., neighborhood→city→region→country.

B. Topological Location

Aggregation at nodes based on the topology of the network is also useful for end hosts to determine whether their service providers (e.g., their Internet Service Providers) are providing the best services. Network providers also can use the aggregated information to identify performance bottlenecks in their networks. Like location, topology can also be broken down into a hierarchy—e.g., subnet→point of presence (PoP)→ISP.

C. Destination Site

Aggregation of information based on destination sites enables USERS to determine whether other USERS are successfully accessing particular network resources (e.g., websites), and if so, what performance they are seeing (e.g., RTTs). Although this sort of information is not hierarchical, in the case of replicated sites, information from different destination sites may be further refined based on the actual replica at a resource being accessed.

D. Bandwidth Class

Aggregation of information based on the bandwidth class of a USER is useful for comparing performance with other USERS within the same class (e.g., dial up users, DSL users) as well as comparing performance with other classes of USERS (e.g., comparing dial up and DSL users).

Figure 9:
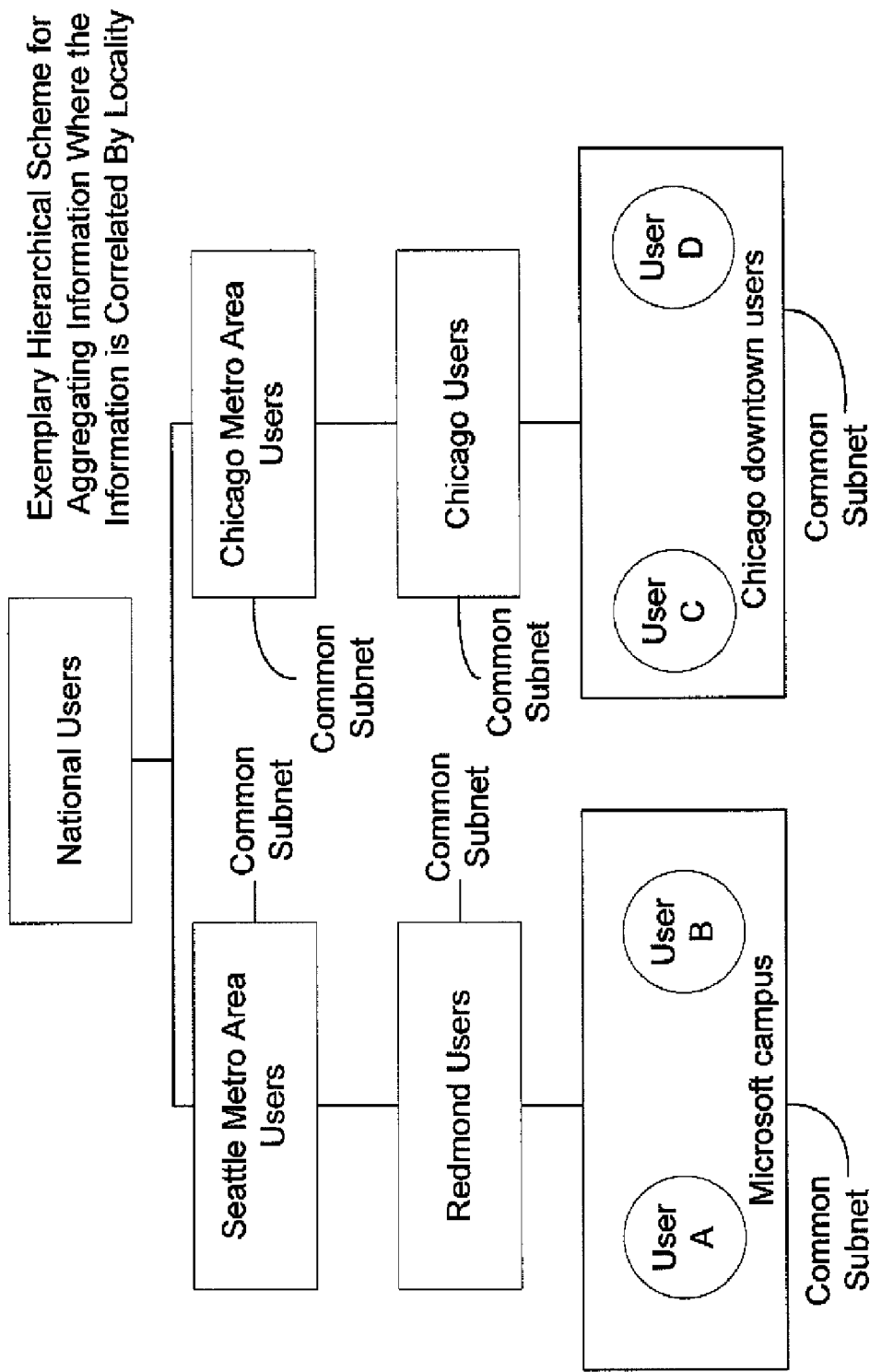
FIG. 9 illustrates an exemplary hierarchal tree structure for information shared by end hosts in the network.

Preferably, aggregation based on attributes such as location and network topology is done in a hierarchical manner, with an aggregation tree logically mirroring the hierarchical nature of the attribute space as suggested by the tree structure for the location attributes illustrated in FIG. 9. USERS at network end hosts are typically interested in detailed information only from nearby peers. For instance, when an end host user is interested in comparing its download performance from a popular website, the most useful comparison is with nodes in the nearby network topology or physical location. Information aggregated from nodes across the country is much less interesting. Thus, the aggregation of the information by location in FIG. 9 builds from a smallest geographic area to the largest. In this regard, a USER at an end host in the network is generally less interested in aggregated views of the performance experienced by nodes at remote physical locations or remote location in the network topology (e.g., the Seattle USERS in FIG. 9 have little interest in information from the Chicago USERS and vice versa). The structure of the aggregation tree in FIG. 9 exploits this generalization to enable the system to scale to a large number of USERS. The above discussion holds true for aggregation based on connectivity as well.

Logical hierarchies of the type illustrated in FIG. 9 may be maintained for each identified attribute such as bandwidth class and destination site and also for pairs of attributes (e.g., bandwidth class and destination site). This structure for organizing the aggregated information enables diagnostics 215 in FIG. 10 at participating USER nodes in a system to provide more fine-grained performance trends based on cross-products of attributes (e.g., the performance of all dialup clients in Seattle while accessing a particular web service). A user interface 216 provides the USER with the results of the processes performed by the diagnostics 215. An exemplary layout for the interface 216 is illustrated in FIG. 13 and described hereinafter. The hierarchy illustrated in FIG. 9 is on an example of the hierarchies that can be implemented n keeping with the invention. Other hierarchies fore example may not incorporate common subnets of the type illustrated in FIG. 9.

Since the number of bandwidth classes is small, it is feasible to maintain separate hierarchies for each class.

In the case of destination sites, separate hierarchies are preferably maintained only for very popular sites. An aggregation tree for a destination hierarchy (not shown) is organized based on geographic or topological locations, with information filtered based on the bandwidth class and destination site attributes. In the case of less popular destination sites, it may be infeasible to maintain per-site trees. In such situations, only a single aggregated view of a site is maintained. In this approach, the ability to further refine based on other attributes is lost.

Information is aggregated at a USER node using any one of several known information management technologies such as distributed hash tables (DHT), distributed file systems or a centralized lookup tables. Preferably, however, DHTs are used as the system for distributing the shared information since they yield a natural aggregation hierarchy. A distributed hash table or DHT is a hash table in which the sets of pairs (key, value) are not all kept on a single node, but are spread across many peer nodes, so that the total table can be much larger than any single node may accommodate.

Figure 11:
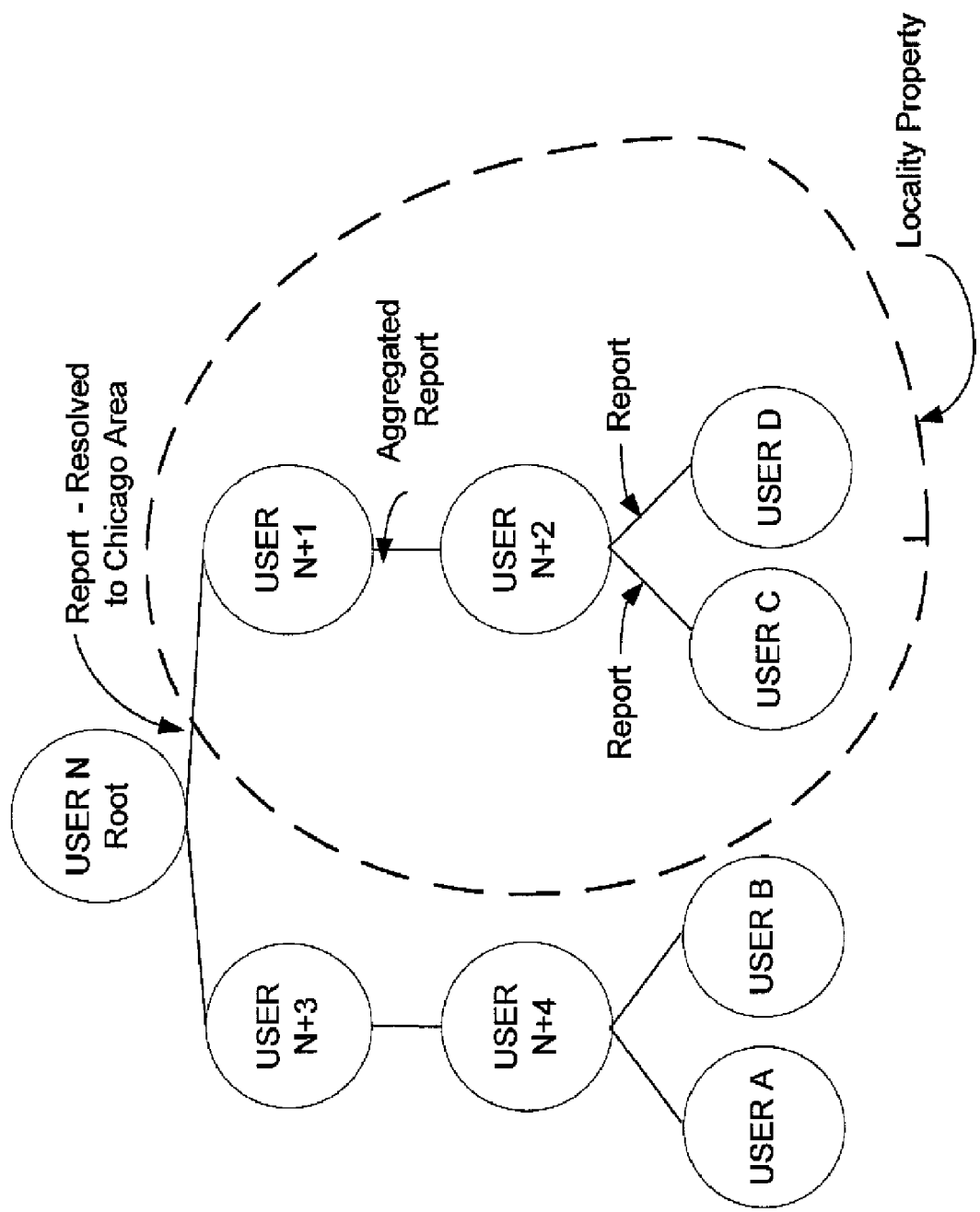
FIG. 11 illustrates an exemplary hierarchical tree structure for sharing information in a peer-to-peer system based on a distributed information system such as distributed hash tables.
Figure 12:
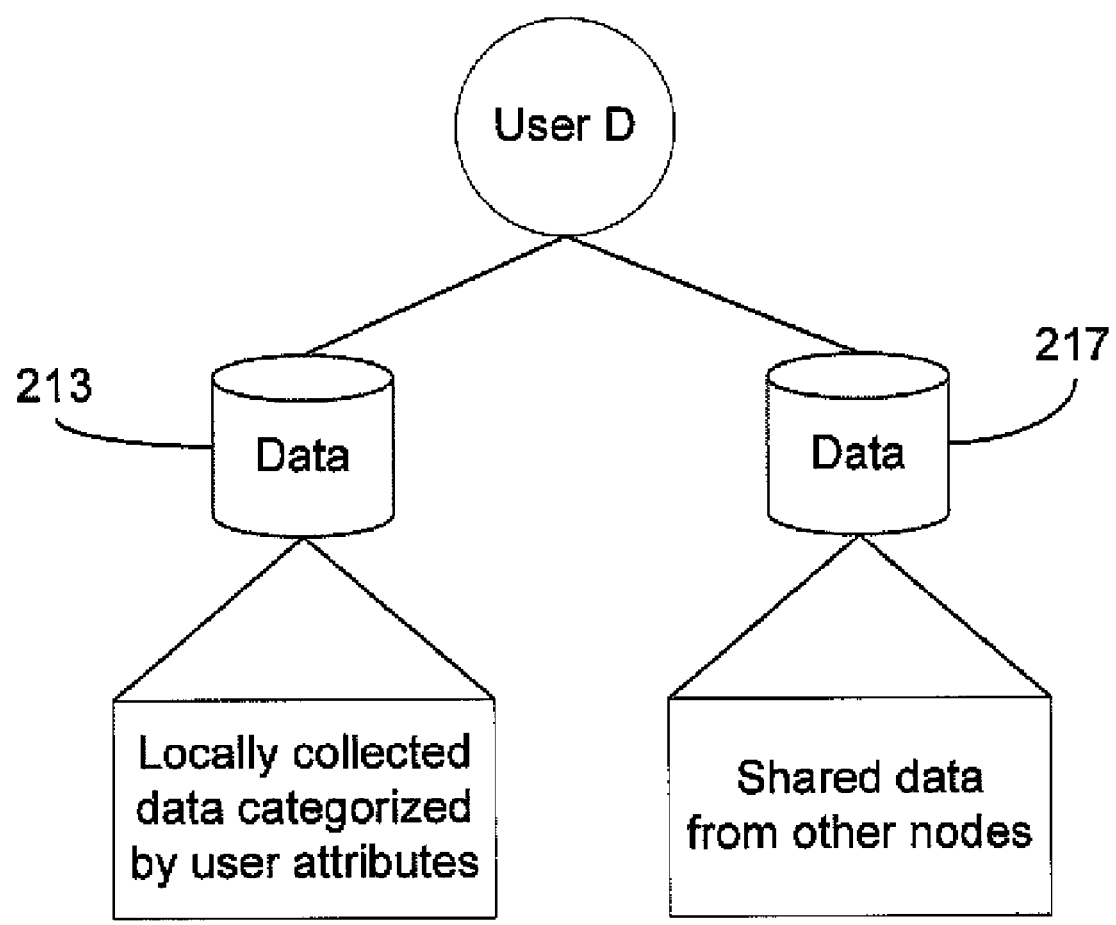
FIG. 12 is a schematic illustration of the databases maintained at each end host in the network that participates in the sharing of performance information.

FIG. 11 illustrates an exemplary topology for distributing the shared information in a manner that complements the hierarchical nature of the aggregated information. The tree structure relating the DHTs at each USER node allows for each node to maintain shared information that is most relevant to it such as information gathered from other USERS in the same locality while passing on all information to a root node N that maintains a full version of the information collected from all of the branches of the tree structure.

Each USER node in the hierarchical tree of FIG. 11 maintains performance information for that node and shared information (in database 217 in FIGS. 10 and 12) derived from any additional nodes further down the tree (i.e., the subtree defined by USER nodes flowing from any node designated as the root node). Each USER node stores the locally collected information that has been normalized in the database 213 illustrated in FIGS. 3 and 12. Periodically, each USER node reports aggregated views of information to a parent node.

Each attribute or combination of attributes for which information is aggregated maintains its own DHT tree structure for sharing the information. This connectivity of the nodes in the DHT ensures that routing the performance report towards an appropriate key (e.g., the node N in FIG. 11), which is obtained by hashing the attribute (or combination of attributes), the intermediate nodes along the path will act as aggregators. In addition, DHTs ensure good locality properties, which may be important to ensure that the aggregator node for a subnet lies within that subnet, for example, as shown in FIG. 11.

IV. Analysis and Diagnosis

A. Distributed Blame Allocation

Figure 10:
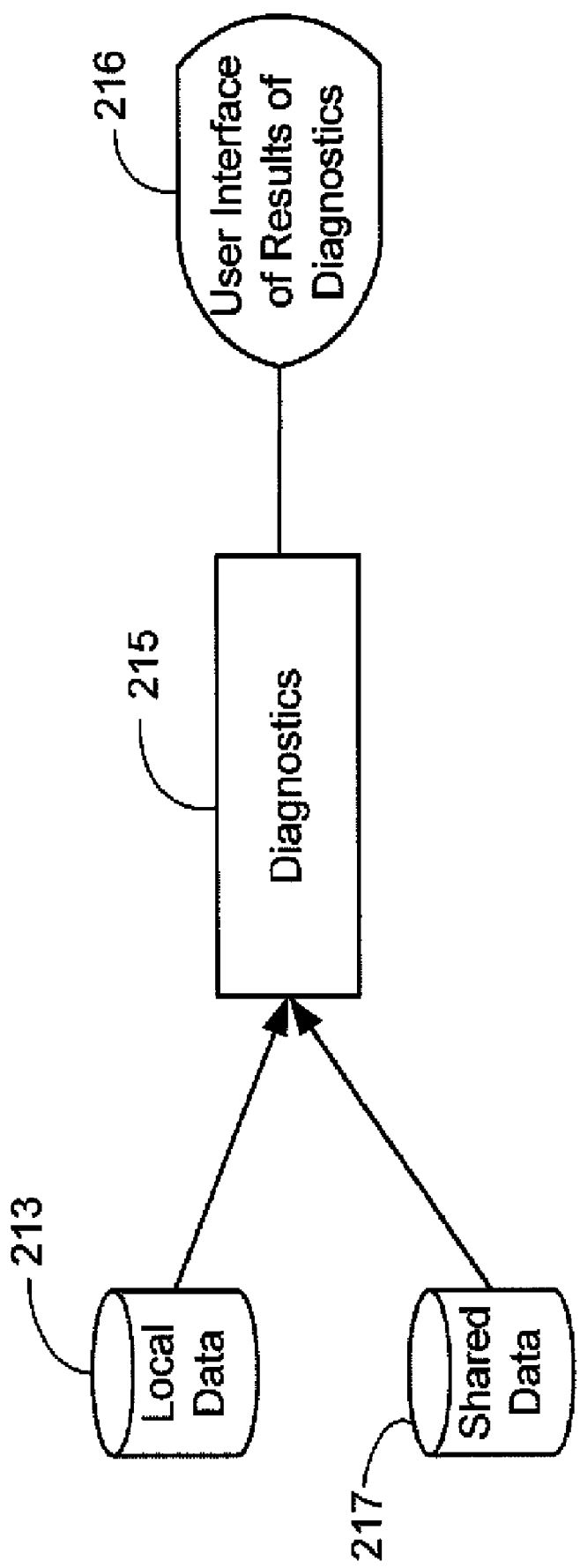
FIG. 10 is a block diagram illustrating the process of analyzing information collected at an end host using the information shared by other end hosts in communications sessions to provide different viewpoints into the network.

USERS experiencing poor performance diagnose the problem using a procedure in the diagnostics 215 in FIG. 10 called "distributed blame allocation."

First, the analysis assumes the cause of the problem is one or more of the entities involved in the end-to-end transaction suffering from the poor performance. The entities typically include the server 207, proxy 203, domain name server (not shown) and the path through the network as illustrated in FIG. 2b. The latency of the domain name server may not be directly visible to a client if the request is made via a proxy.

The resolution of the path depends on the information available (e.g., the full AS-level path or simply the ISP/PoP to which the client connects). To implement the assumption, the simplest policy is for a USER to ascribe the blame equally to all of the entities. But a USER can assign blame unequally if it suspects certain entities more than others based on the information gleaned from the local sensors such as the TCP and WEB sensors 201 and 205, respectively.

This relative allocation of blame is then aggregated across USERS. The aggregate blame assigned to an entity is normalized to reflect the fraction of transactions involving the entity that encountered a problem. The entities with the largest blame score are inferred to be the likely trouble spots.

The hierarchical scheme for organizing the aggregated information naturally supports this distributed blame allocation scheme. Each USER relies on the performance it experiences to update the performance records of entities at each level of the information hierarchy. Given this structure, finding the suspect entity is then a process of walking up the hierarchy of information for an attribute while looking for the highest-level entity whose aggregated performance information indicates a problem (based on suitably-picked thresholds). The analysis reflects a preference for picking an entity at a higher level in the hierarchy that is shared with other USERS as the common cause for an observed performance problem because in general a single cause is more likely than multiple separate causes. For example, if USERS connected to most of the PoPs of a web service are experiencing problems, then it's reasonable to expect s that there is a general problem with the web service itself rather than a specific problem at the individual PoPs.

B. Comparative Analysis

A USER benefits from knowledge of its network performance relative to that of other USERS, especially those within physical proximity of one another (e.g., same city or same neighborhood). Use of this attribute to aggregate information at a USER is useful to drive decisions such as whether to upgrade to a higher level of service or switch ISPs. For instance, a USER whose aggregated data shows he/she is consistently seeing worse performance than others on the same subnet in FIG. 3 (e.g., the same ISP network) and in the same geographic neighborhood has evidence upon which to base a demand for an investigation by the ISP. Without such comparative information, the USER lacks any indication of the source of the problem and has nothing to challenge an assertion by the ISP that the problem is not at the ISP. As another example, a USER who is considering upgrading from low-end to high-end digital subscriber line (DSL) service is able to compare notes with existing high-end DSL users in the same geographic area and determine how much improvement an upgrade may actually be realized, rather than simply going by the speed advertised by the ISP.

At higher levels in the aggregation of information in FIG. 3, service providers are enabled to analyze the network infrastructure in order to isolate performance problems. For example, a consumer ISP that buys infrastructural services such as modem banks and backhaul bandwidth from third-party providers monitors the performance experienced by its customers in different locations such as Seattle and Chicago in FIG. 3. The ISP may find, for instance, that its customers in Seattle are consistently underperforming customers in Chicago, giving it information from which it could reasonably suspect the local infrastructure provider(s) in Seattle are responsible for the problem.

C. Network Engineering Analysis

A network operator can use detailed information gleaned from USERS participating in the peer-to-peer collection and sharing of information as described herein to make an informed decision on how to re-engineer or upgrade the network. For instance, an IT department of a large global enterprise tasked with provisioning network connectivity for dozens of corporate sites spread across the globe has a plethora of choices in terms of connectivity options (ranging from expensive leased lines to the cheaper VPN over the public Internet alternative), service providers, bandwidth, etc. The department's objective is typically to balance the twin goals of low cost and good performance. While existing tools and methodologies (e.g., monitoring link utilization) help to achieve these goals, the ultimate test is how well the network serves end hosts in their day-to-day activities. Hence, the shared information from the peer-to-peer network complements existing sources of information and leads to more informed decisions. For example, significant packet loss rate coupled with the knowledge that the egress link utilization is low points to a potential problem with a chosen service provider and suggests switching to a leased line alternative. Low packet loss rate but a large RTT and hence poor performance suggests setting up a local proxy cache or Exchange server at the site despite the higher cost compared to a central server cluster at the corporate headquarters.

The aggregated information is also amenable to being mined for generating reports on the health of wide-area networks such as the Internet or large enterprise networks.

V. Experimental Results

An experimental setup consisted of a set of heterogeneous USERS that repeatedly download content from a diverse set of 70 web sites during a four-week period. The set of USERS included 147 PlanetLab nodes, dialup hosts connected to 26 PoPs on the MSN network, and five hosts on Microsoft's worldwide corporate network. The goal of the experiment was to emulate a set of USERS sharing information to diagnose problems in keeping with the description herein.

During the course of the experiment, several failure episodes were observed during which accesses to a website failed at most or all of the clients. The widespread impact across USERS in diverse locations suggests a server-side cause for these problems. It would be hard to make such a determination based just on the view from a single client.

There are significant differences in the failure rate observed by USERS that are seemingly "equivalent." Among the MSN dialup nodes, for example, those connected to PoPs with a first ISP as the upstream provider experienced a much lower failure rate (0.2-0.3%) than those connected to PoPs with other upstream providers (1.6-1.9%). This information helps MSN identify underperforming providers and enables it to take the necessary action to rectify the problem. Similarly, USERS at one location have a much higher failure rate (1.65%) than those in another (0.19%). This information enables USERS at the first location to pursue the matter with their local network administrators.

Sometimes a group of USERS shares a certain network problem that is not affecting other USERS. One or more attributes shared by the group may suggest the cause of the problem. For example, all five USERS on a Microsoft corporate network experienced a high failure rate (8%) in accessing a web service, whereas the failure rate for other USERS was negligible. Since the Microsoft USERS are located in different countries and connect via different web proxies with distinct wide area network (WAN) connectivity, the problem is diagnosed as likely being due to a common proxy configuration across the sites.

In other instances, a problem is unique to a specific client-server pair. For example, assume the Microsoft corporate network node in China is never able to access a website, whereas other nodes, including the ones at other Microsoft sites, do not experience a problem. This information suggests that the problem is specific to the path between the China node and the website (e.g., siteblocking by the local provider). If there was access to information from multiple clients in China, the diagnose may be more particular.

Figure 13A:
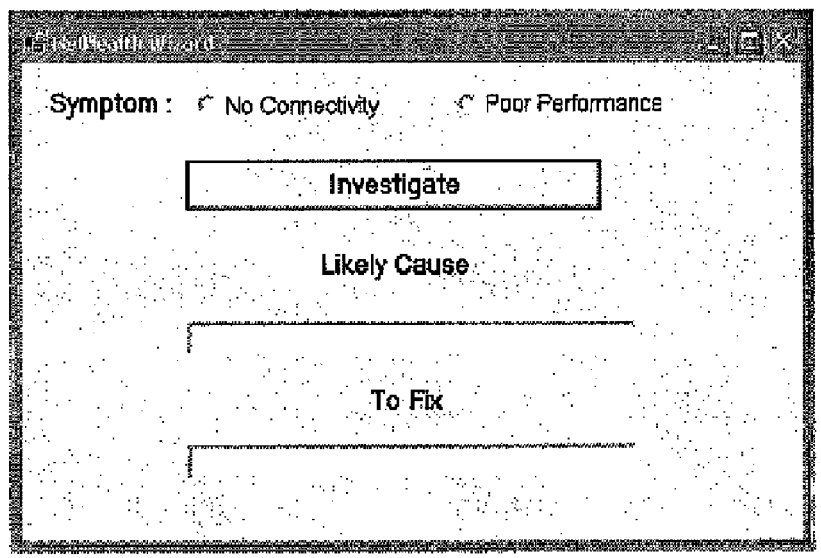
FIGS. 13a and 13b are exemplary user interfaces for the processes that collect and analyze information.
Figure 13B:
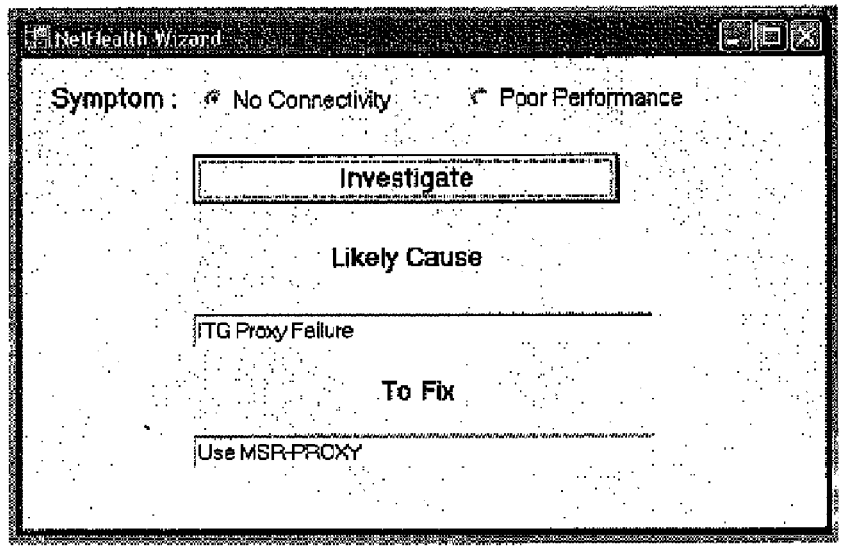

FIGS. 13a and 13b illustrate an exemplary user interface for the invention. When a user at an end host experiences communication problems with the network environment, a process is instantiated by the user that analyzes the collected data and provides a diagnosis. In FIG. 13a, the user interface for the process calls the process "NetHealth." NetHealth analyzes the collected data and provides an initial indication as to whether the problem results from no connection or poor performance of the connection. In FIG. 13b, the process has completed its analysis and the user interface indicates the source of the problem is a lack of connection. Because the connection could fail at several places in the network, the user interface includes a dialog field identifying the likely cause of the problem or symptom and another dialog field that provides a suggestion for fixing the problem given the identified cause.

VI. Deployment Models

There are two deployment models for the invention—coordinated and organic. In the coordinated model, deployment is accomplished by an organization such as the IT department of an enterprise. The network administrator does the installation. The fact that all USERS are in a single administrative domain simplifies the issues of deployment and security. In the organic model, however, USERS install the necessary software themselves (e.g., on their home machines) in much the same way as they install other peer-to-peer applications. The motivation to install the software sources from a USER's desire to obtain better insight into the network performance. In this deployment model, bootstrapping the system is a significant aspect of the implementation.

A. Bootstrapping

To be effective, the invention requires the participation of a sufficient number of USERS that overlap and differ in attributes. In that way meaningful comparisons can be made and conclusions drawn. When a single network operator controls distribution, bootstrapping the system into existence is easy since the IT department very quickly deploys the software for the invention on a large number of USER machines in various locations throughout the enterprise, essentially by fiat.

Bootstrapping the software into existence on an open network such as the Internet is much more involved, requiring USERS to install the software by choice. Because the advantages of the invention are best realized when there are a significant number of network nodes sharing information, starting from a small number of nodes makes it difficult to grow because the small number reduces the value of the data and present and inhibits the desire of others to add the software to USER machines. To help bootstrap in open network environments, a limited amount of active probing (e.g., web downloads that the USER would not have performed in normal course) are employed initially. USERS perform active downloads either autonomously (e.g., like Keynote clients) or in response to a request from a peer. Of course, the latter option should be used with caution to avoid becoming a vehicle for attacks or offending users, say by downloading from "undesirable" sites. In any case, once the deployment has reached a certain size, active probing is turned off.

B. Security

The issues of privacy and data integrity pose significant challenges to the deployment and functioning of the invention. These issues are arguably of less concern in a controlled environment such as an enterprise.

Users may not want to divulge their identity, or even their IP address, when reporting performance. To help protect their privacy, clients could be given the option of identifying themselves at a coarse granularity that they are comfortable with (e.g., at the ISP level), but that still enables interesting analyses. Furthermore, anonymous communication techniques, that hide whether the sending node actually originated a message or is merely forwarding it, could be used to prevent exposure through direct communication. However, if performance reports are stripped of all client-identifying information, only very limited analyses and inference can be performed (e.g., only able to infer website-wide problems that affect most or all clients).

There is also the related issue of data integrity—an attacker may spoof performance reports and/or corrupt the aggregation procedure. In general, guaranteeing data integrity requires sacrificing privacy. However, in view of the likely uses of the invention as an advisory tool, it is probably acceptable to have a reasonable assurance of data integrity, even if not ironclad guarantees. For instance, the problem of spoofing is alleviated by insisting on a two-way handshake before accepting a performance report. The threat of data corruption is mitigated by aggregating performance reports along multiple hierarchies and employing some form of majority voting when there is disagreement.

WebProfiler Embodiment

Despite the tremendous growth of the Web and our reliance on it, a surprisingly large number of attempts to access websites still fail today. The popularity of the Web is fueling an ever increasing number of users which in turn places additional load on HTTP servers and other Web infrastructure. More complex Web applications, such as social networking websites, require server resources beyond that of serving traditional static web pages. The spread of the Internet to various corners of the World is increasing the complexity of Internet infrastructure such as the routing, DNS (Domain Name Server) and CDN (Content Distribution Network) systems. Users now expect Web access from more diverse locations, such as mobile phones and the workplace, which typically employ infrastructure such as firewalls and HTTP proxies to filter malicious content, restrict user access and adapt content to different devices. As a result, users do see web failures and they are increasingly difficult to automatically diagnose.

When a failure does occur, users are typically presented with vague and generic information about the cause. Users may try to reload the page repeatedly, modify their machine or browser configuration, or simply try again later. Yet, depending on the cause, none of these actions may resolve the problem leaving the user frustrated.

There are existing techniques for diagnosing Web failures. HTTP server logs can be analyzed by website administrators to look for requests that generated HTTP errors. However, these logs do not contain access attempts that did not even reach the website (e.g., due to DNS failures, HTTP proxy failures). HTTP proxy or edge router logs can be analyzed by enterprise administrators—medium to large corporations typically use HTTP caching proxies to improve performance and filter harmful web content. These logs include details such as the client IP address, server IP address, URL accessed and HTTP success/error code. However, again, logs collected at the network edge do not include access attempts that failed to reach it (e.g., due to DNS failures, internal routing failures). Recently proposed techniques for constructing inference graphs of multi-level dependencies in enterprise networks use packet traces to probabilistically infer the network components involved in a transaction and identify the culprit if a large number of requests fail. Such systems rely on probabilistic techniques to separate out multiple simultaneous network flows into transactions related to the same application-level action, and are impeded when end-to-end encryption such as IPSec is used.

We present WebProfiler, which employs end-host cooperation to pool together observations of Web access failures and successes from multiple vantage points. WebProfiler exploits clients that use different network elements (e.g. DNS servers, HTTP caches) in a collaborative blame attribution algorithm to identify those network elements that are often involved in failures rather than successes. Our distributed system relies on a lightweight Web browser plug-in on each client that monitors the success and failure of any web transaction and shares this with the WebProfiler system. The use of a lightweight application layer plug-in for monitoring results in a system that works even with IPSec encryption, detects all client failures, does not require packet sniffing and can be incrementally deployed via software updates.

While the concepts behind WebProfiler are applicable to other networks such as residential access and the Internet in general, we focus on enterprises in our implementation and evaluation. In doing so, we are able to present the cooperative system design and collaborative diagnosis algorithm in detail without having to address system scalability beyond large enterprises (e.g. 100,000 employees). In terms of privacy, even though our approach detects more errors than in router or proxy logs, the type of data we collect is similar to what enterprise administrators can see in such logs. Furthermore, users do not directly interact with the data, but instead see the names of network components that our diagnosis tool blames for failures. We focus on enterprises without loss of generality in diagnosis. In fact, typical enterprise networks increase diagnosis complexity due to additional network components that can contribute to Web failures—internal vs. external DNS servers, NetBios or WINS (Windows Internet Name Service) resolution, HTTP proxies, internal vs. external websites, etc.

Our novel contributions include an architecture for sharing Web success/failure observations across a diverse set of clients, a simple blame attribution algorithm that identifies the most likely suspect(s) responsible for a failure, a working prototype and its experimental evaluation. Experiments with 25 clients over 13 days on a controlled testbed demonstrate that WebProfiler can accurately diagnose 3.6 times as many failures than from a single client's perspective.

Motivation

Nature of Web Failures

Visiting a website through a browser can involve a series of network transactions, depending on the network configuration:

lookup HTTP proxy name via WPAD (Web Proxy Auto-discovery Protocol)
lookup proxy IP addr. via WINS or internal DNS server
issue HTTP request to proxy
proxy looks up website addr. via external DNS server
proxy issues HTTP request to website IP address
website's or CDN replica's HTTP server responds
firewall or proxy parses, filters content for client Some failures can be trivially diagnosed. For example, the Ethernet cable is unplugged; the local DNS server has crashed and is not responding to any lookups. In such cases, the cause can be identified from a single client's perspective.

Failures that are not fail-stop are much harder to diagnose. For example, a clients local subnet switch is overloaded and is dropping 20% of packets or flows; one of the CDN servers has crashed and so only some of the website accesses fail. Without additional information from beyond one client, such as the status of accesses from other subnets or from clients with other DNS servers that point to different CDN replicas, the failure is difficult to diagnose.

Failures that have multiple culprits are also much harder to diagnose. For example, a website denies accesses from a particular IP address (for a corporate proxy or public library's NAT (Network Address Translation) router; because the site's IDS (Intrusion Detection System) has mistaken it to be a bot due to the large number of requests from it). With respect to resolving the client's problem, the combination of this website and this proxy is to blame—the client can either continue to use this proxy for other websites, or change the proxy and then access this website.

In our prior Web failure measurement study involving a diverse set of 134 clients in academic and corporate, broadband and dial-up networks, we observed a range of problems that impacted Web access. Many failures could not be diagnosed from a single client's vantage point, for example where a website was accessible from some clients but not others.

Why Collaborative Diagnosis?

To overcome limited visibility, we can leverage multiple clients in the hope that they have different yet overlapping views of the network. For example, a client that fails to establish an HTTP session with a web server cannot reliably determine if the HTTP server is down, or is refusing connections from the client IP address (or that of its proxy), or was pointed to a stale replica of the website by DNS. However, information from another client on the same subnet that uses a different DNS server and gets a different but working replica of the website can help diagnose and solve the problem.

Many networks have clients that have some network elements in common but differ on others. For example, medium to large enterprise networks typically have multiple subnets, multiple internal DNS servers and multiple HTTP proxies. Collaborative diagnosis across such diverse clients would provide an interwoven mesh of observations on Web accesses, helping to identify the most likely suspects responsible for the observed failures.

Why Client Cooperation?

Compared to approaches that analyze server logs or packet traces, client cooperation has several advantages. By collecting information on Web successes and failures directly from the client, all types of errors are captured, even those that are not recorded in proxy or server logs. User behavior can also be directly captured—did the Web page not load because the user hit stop early in the transaction? Users pre-maturely aborting transactions should not be mistaken for failures.

Capturing information directly from the client application has four main advantages that greatly reduce complexity compared to prior techniques that rely on packet traces.

Parsers for the various protocols in packet traces are not needed (HTTP, DNS, WINS, TCP, etc.)—the application layer that issues the protocol commands can directly provide this information as well as resulting error codes.

The Web browser maintains state about individual network transactions associated with the same URL access, which we can directly obtain. In contrast, packet traces will show multiple overlapping network transactions and reconstructing the original application transaction is not trivial. For example, a single attempt to access http://www.cnn.com/ can trigger several DNS lookups and HTTP transactions (different servers for HTML, images, advertisements). If a user has multiple browser windows open, or multiple applications, this can be even harder.

Compared to packet traces, the amount of information that is needed from the application layer is extremely small and hence places almost no load on the client.

Application layer capture is agnostic to network layer encryption such as IPSec.

This approach allows incremental deployment via software updates. Furthermore, greater the number and diversity of contributing clients the more accurate the diagnosis is likely to be.

WebProfiler Architecture

Figure 14:
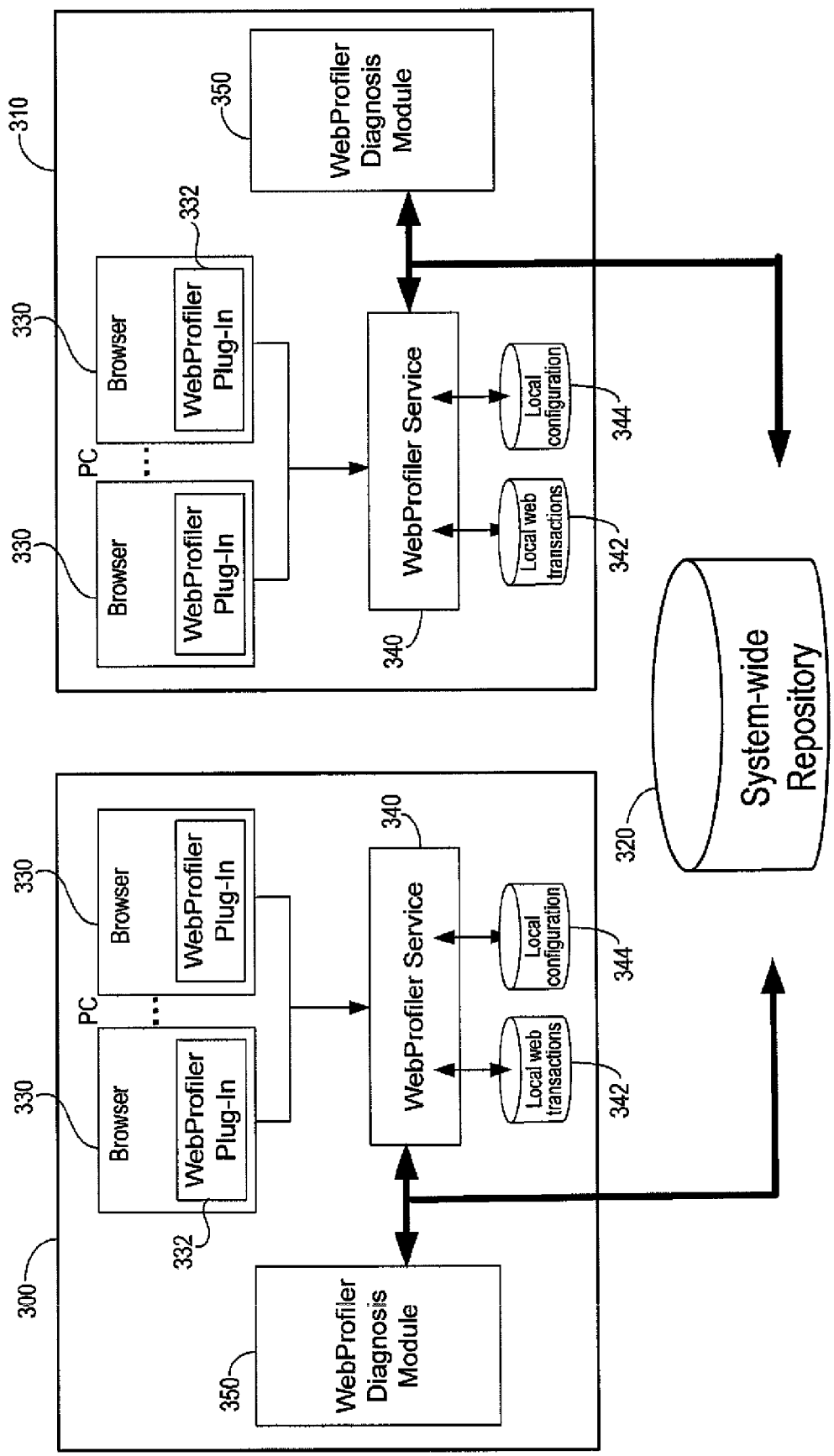
FIG. 14 is a block diagram that shows a WebProfiler architecture in accordance with an embodiment of the invention.

Clients cooperating in WebProfiler collect fine-grained observations of individual Web transactions, and share this with each other. A client joining WebProfiler performs a one-time software install, which includes a Web browser plug-in, a network service and a diagnosis module. FIG. 14 shows WebProfiler's main components. Client devices 300 and 310 supply Web transaction information to a system-wide repository 320. In FIG. 14, two client devices are shown. However, a larger number of client devices may supply Web transaction information to the system-wide repository 320 in a practical implementation. As shown, each client device includes a Web browser 330 which may be launched one or more times. The WebProfiler includes a Web browser plug-in 332 to monitor Web transactions and collect Web transaction information. The Web transaction information is provided to a WebProfiler service 340. The WebProfiler service 340 records the Web transaction information in a local database 342 and in the system-wide repository 320. WebProfiler service 340 obtains local configuration information from a configuration database 344. As described below, a WebProfiler diagnosis module 350 performs analyses of Web transaction failures using selected information stored in system-wide repository 320.

Browser Plug-in

To perform fine-grained diagnosis of Web failures, we need: (a) information about user actions, such as when the user attempts to access a Web page and when she hits "Stop", and (b) details about the Web transaction, such as what IP address the request went to, how long it took and what errors, if any, were returned. Popular browsers export rich APIs for extensibility which allows us to build a plug-in that can perform this event monitoring.

Our plug-in automatically loads when the browser is launched and runs within the browser process. It attaches a separate listener to each tab or window the user opens. The listener monitors browser events of interest, including successful transactions and any failures that occur during browsing. This platform allows broad definitions of failure—we consider Web page loads that take too long to be failures.

WebProfiler Service

Information about each Web transaction is sent over a local channel from the plug-in to the WebProfiler service on the same machine. The daemon service aggregates information from multiple browser instances on the same machine. It records Web transaction data in a local data store on the hard drive. When the system-wide repository is available, the service periodically sends this data to it. The local store allows the service to continue recording information during network partitions, when the system-wide repository is unavailable.

The service also periodically collects Web browser and network configuration settings, such as HTTP proxy settings and DNS server addresses. This is needed to correlate an observed failure with the network configuration at the time.

System-wide Repository

The system-wide repository collects information sent by WebProfiler services running on different clients. It contains an aggregation of data from several clients: machine configurations, and the results of all attempted Web transactions (although, with a large number of participating clients, this could be sampled). These records are then looked up by our diagnosis algorithm which is described in the next section.

While our design and current prototype share the full complement of information on transactions with the system-wide repository, this is not necessary. WebProfiler requires clients to only increment the aggregate success/failure counts, maintained in the system-wide repository, for network elements involved in a transaction (client, proxy, server, etc.). We implement full sharing for debugging our prototype and more detailed analysis for this paper.

For corporate intranets, where there is typically some form of centralized control, the repository can be a database server. While our diagnosis primarily targets end users, this single data store implementation is simple and allows data inspection and analysis by system administrators as well. Basic connectivity failures (e.g., subnet gateway failure) can affect both Web transactions and access to a database server. However, trivial connectivity issues can be directly diagnosed at the client without cooperation.

To share information across the wide area Internet, the repository can be implemented using a P2P DHT. This does not require dedicated servers and allows ad hoc collaboration between any subset of clients. For example, there can be multiple, distinct DHT "rings" e.g., for the subnet, campus, and Internet. Each client would join the rings corresponding to its location and report relevant information into each ring.

Our prototype, described below, targets failure diagnosis in an enterprise network and thus implements the system-wide repository in a centralized fashion.

Web Failure Diagnosis

We now present our goals in diagnosing Web failures for users and then examine our simple, collaborative, blame attribution algorithm.

Diagnosis Scope

The primary customers of WebProfiler's diagnosis are end users and we scope our diagnosis accordingly. The network element(s) that we blame for a failure are those visible to the client and, in some cases, an alternate can be used. Thus WebProfiler focuses on problems:

- solved by changing a setting on the client (e.g., switch to a good HTTP proxy);
- specific to the client's location, e.g., if a subnet is blamed, the user can switch from the wireless network to wired Ethernet or walk to a different access point;

at the server end. Users can go to a different CDN replica or another website (e.g., if looking for generic news), contact a help line (e.g., for a banking site), or, at the very least, avoid frustration knowing that the Web site is just down.

This indicates the type of diagnosis that is of primary interest to end users, and is therefore our goal in WebProfiler. Nonetheless, such diagnosis can also be of tremendous value to network administrators who cannot detect from server logs those failures that happen closer to clients. However, we cannot diagnose problems not visible to clients, such as which router is to blame for poor performance on an end-to-end path.

Diagnosis Procedure

Figure 15:
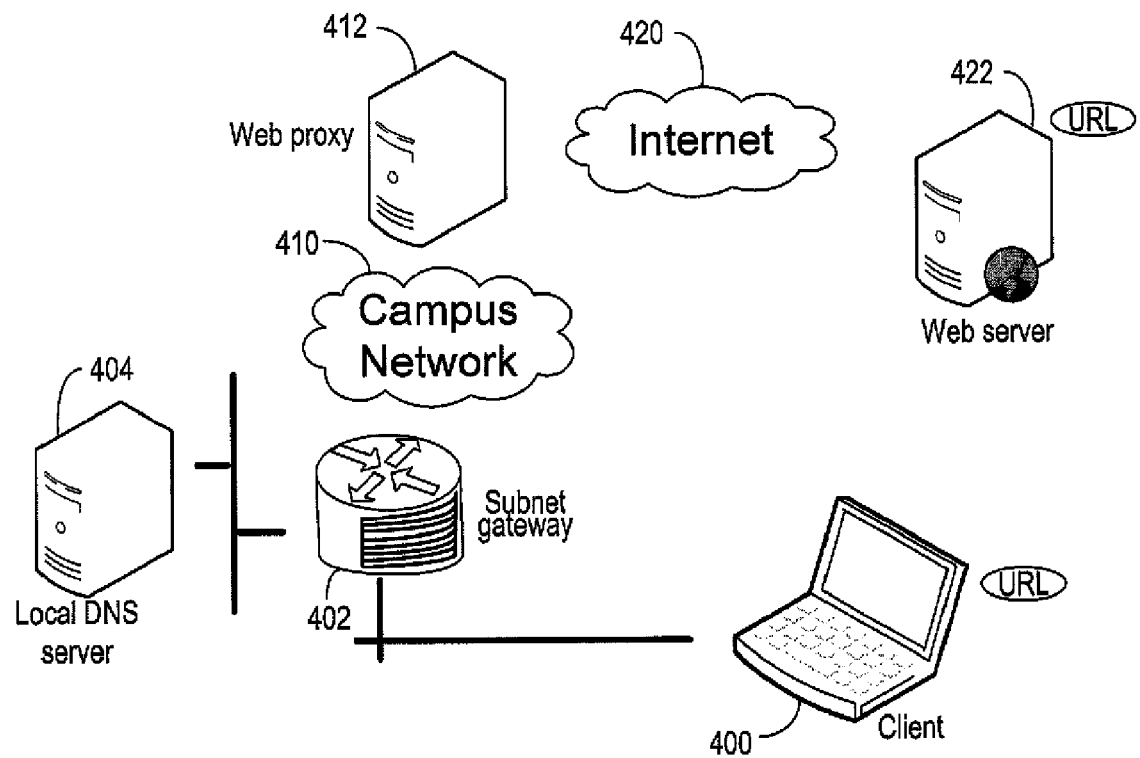
FIG. 15 is a block diagram that shows an example of network entities involved in a typical Web transaction.

Based on these goals, WebProfiler diagnoses failures at the granularity of client-visible network elements or entities such as those in FIG. 15. As shown by way of example only in FIG. 15, a Web transaction may involve a client 400, a subnet gateway 402, a local DNS server 404, campus network 410, a Web proxy 412, the Internet 420 and a Web server 422. Let $E=\{E_1, E_2, \ldots, E_n\}$ denote the set of entities associated with a page download. For example, E might be {clientIP, clientSubnet, DNSserverIP, proxyIP, CDNserverIP, URL}. If the download succeeds, we presume that each of these entities worked fine; if it fails, any one client's perspective may not be enough to finger the culprit.

We use a simple blame attribution algorithm outlined in FIG. 16. For each entity, $E_i$, there are two counts, $S_i$ and $F_i$, of the successful and failed downloads, respectively, that involve entity $E_i$. The entity's blame score is $B_i = F_i/(S_i+F_i)$. Entities with an abnormally high blame score are suspects for a given failure. This blame score is compared against the distribution of blame scores for all known entities of the same functional type. For example, we would compare the blame score for proxy P1 against the distribution of scores for proxies P1, P2, . . . Pn (assuming there are n proxies in the network). We consider blame score distributions within the same functional type under the intuition that the incidence of failure that is normal for one type of entity may be abnormal for another type of entity.

We recommend blame scores that are two standard deviations above the mean to be abnormally high, but this may be deployment-dependent. By way of example, assume a network has 10 proxies and the mean blame score across all proxies is 0.01 (i.e. about 1% of failures are seen on average across all requests going through these proxies) and the standard deviation is 0.005. If there is one proxy where the blame score across all requests that go through it is 0.1 (i.e. 10% of all requests going through the proxy fail), then the blame is score of that proxy is considered to be abnormally high because it is more than two standard deviations above the mean (0.01+0.005+0.005=0.02).

An entity's blame score, while primarily reflecting its own failure rate, is also "polluted" by the failures of other entities that it is coupled with as part of page downloads. The intuition behind blame attribution is that, given a large and diverse set of observations, such incidental attribution of blame will be diminished and the true culprit will stand out. For this to be true, more complex entity relations must be considered as well. For example, Web server W1 might block requests from a particular subnet S1. The blame score of neither W1 nor S1 might stand out, but the score of the combination of [W1, S1] will. Thus we expand the set of entities E associated with a page download to also include combinations of the base entities. To limit combinatorial explosion, our prototype considers only individual entities and pairs of entities. We believe it would be rare and rather unusual for failures to be caused by triplets or larger combinations of the base entities. Our evaluation shows that considering single entities and pairs captures most of the observed failure scenarios.

Finally, in keeping with the principle of parsimony, we strive to find the simplest explanation that is supported by the observations. That is, we lay the blame on the smallest entity with abnormally high blame scores. For example, if [W1, S1] has a high blame score, and [W1] also has a high blame score, but [S1] has a low blame score, then [W1] is the most likely suspect.

The timescale of diagnosis depends on the density of deployment. The larger the number of clients participating in WebProfiler, the shorter the timescale at which we can meaningfully compute blame scores, and the finer the time resolution of diagnosis. In our evaluation, we work with a timescale of 1000 minutes given our limited deployment.

Communication Overhead

Collaborative diagnosis comes at the cost of network communication overhead in pooling together observations from diverse clients. However, as previously mentioned above, our blame attribution algorithm needs to share only the success and failure counts for entities involved in Web transactions. Thus once the list of entities is populated, each Web transaction only increments counters. This incrementing can be done in batches to further reduce overhead. Also, clients can sample instead of reporting all their transactions. Finally, some observations do not need to be shared beyond limited scopes. For instance, the blame score of a subnet gateway is not relevant beyond that subnet.

Implementation

We have implemented a prototype of the WebProfiler architecture on the Microsoft Windows platform. In this section, we provide details on our implementations of the browser plug-in, network service and system-wide repository, and point out the prototype's limitations.

Browser Plug-in

Figure 17:
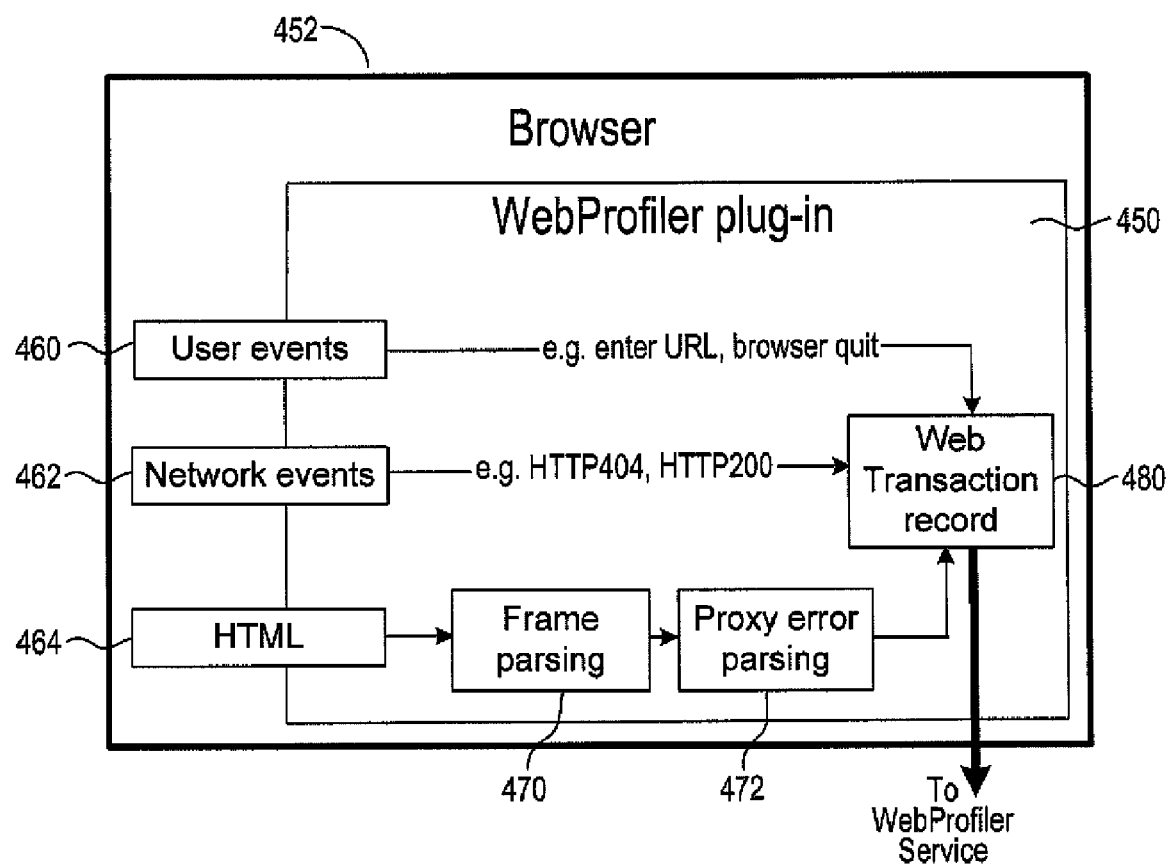
FIG. 17 is a block diagram of a Web browser plug-in implementation in accordance with an embodiment of the invention.

FIG. 17 shows the major components of a Web browser plug-in 450, which is implemented as a Browser Helper Object in C#, and runs within Internet Explorer-7 452. The plug-in obtains several user and network events from IE-7. User events 460 such as opening a new tab/window, navigating to a new URL and closing a tab are used to delineate separate browsing sessions. Network events 462 include completion of a Web page load, HTTP redirections and any HTTP or transport-level errors.

The plug-in also parses the HTML 464 of downloaded Web pages with frame parsing 470 to understand the frame structure, and extracts the frame URLs to distinguish between frame-level errors and top-level page errors. In addition, it detects when the returned HTML is actually a formatted error message from an HTTP proxy with proxy error parsing 472, and extracts information about the problem the proxy encountered in communicating with the Web site.

For every Web transaction, the plug-in constructs a Web transaction record 480, which it then passes to the network service via the .NET Remoting framework. This provides convenient interprocess communication primitives, while also taking care of data marshaling and unmarshaling. In particular, the is following information for every transaction is sent to the service:

date & time; total download time; URL requested; URL received; success or HTTP error code; premature exit by user?; IP address of HTTP proxy used (if any); error code returned by HTTP proxy (if any)

At any time, there can be multiple plug-ins running on the same client machine, either because the user has launched multiple IE-7 windows or tabs, or due to IE-7 having been launched by multiple users on a server OS. All these plug-ins communicate with a single WebProfiler service instance running on the client.

WebProfiler Service

Figure 18:
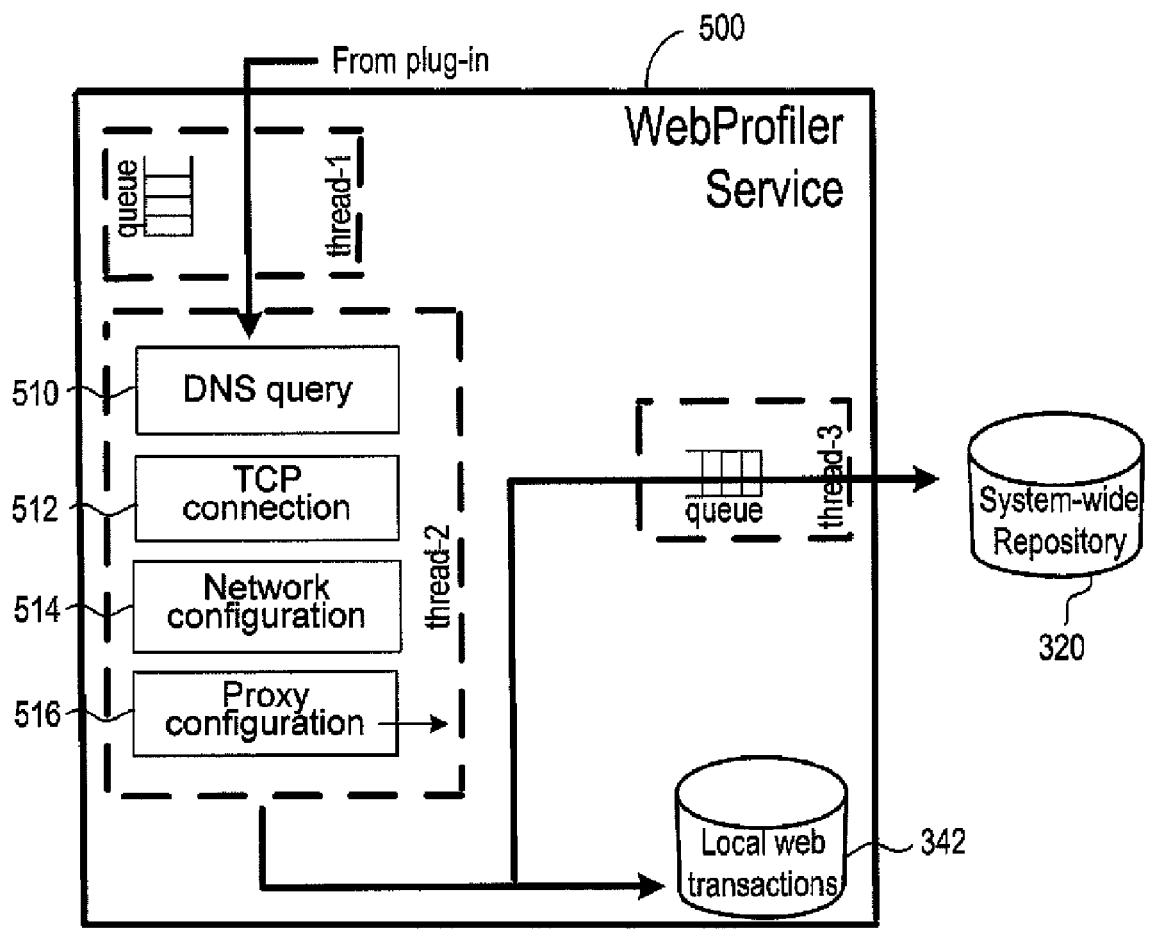
FIG. 18 is a block diagram of a WebProfiler service implementation in accordance with an embodiment of the invention.

FIG. 18 shows the major components of an implementation of a WebProfiler service 500. It is implemented as a Windows Service and is automatically started and shut down by the OS at system boot and halt. It runs with the same privileges as other network services on the client machine. WebProfiler service 500 includes functions of DNS query 510, and obtaining TCP connection information 512, network configuration information 514 and proxy configuration information 516. As shown, the Web transaction information is provided to local database 342 and to system-wide repository 320.

The service gets the client's network settings via the System.Net.NetworkInformation.NetworkChange .NET class which also alerts the service to any setting changes. The service determines the use of a socket-level proxy by detecting the presence of configuration files for the Microsoft ISA firewall in the local file system. It is alerted to any changes to these files via the System.IO. FileSystemWatcher.NET class.

For every Web transaction record it receives, the service also needs detailed information about the outcome of DNS and TCP attempts that IE-7 made. Unfortunately, we have not yet been able to determine how to grab DNS and TCP error codes from the application level WinInet library that IE-7 uses to fetch Web pages. As a workaround, our service re-issues DNS queries for the Web server name and the HTTP proxy name for all Web transaction records. It is likely that these second attempts, performed immediately after the primary ones by the browser, will suffer the same fate and will be served out of the DNS cache on the client. Our service attempts a TCP connection for every failed transaction with a non-HTTP failure code from IE-7. For sending DNS and TCP messages we use the Dns.GetHostEntry and Sockets.TcpClient classes in System.Net.

Local Database

For every Web transaction record the service attaches the following additional information:

hostnames for {client, socket proxy}; IPv4 and IPv6 addresses for {client, gateway, WINS server, DNS server}; DNS A-record and AAAA-record lookup results and error codes for {Web site, HTTP proxy, socket proxy}; TCP connection error codes for {Web site, HTTP proxy}

This augmented Web transaction record is then stored locally in a database file using the .NET OLE DB class. The service also submits the record to the system-wide repository. To avoid blocking the entire service when interacting with the local database or the system-wide repository we employ a combination of queues, timers and threads shown in FIG. 18. Thread-1 interacts with (multiple) plug-ins on the client and adds each incoming Web transaction record to a local FIFO queue. Every 5 seconds, a timer wakes thread-2 to service this queue by adding DNS, TCP, network settings and socket proxy configuration to the record and writing it to the local database file. It also adds the record to a queue for the system-wide repository. Every 10 seconds, another timer wakes thread-3 to service that queue and upload records to the repository. If the repository is unreachable, this thread backs off exponentially up to a maximum of 5000 seconds. These settings of 5, 10 and 5000 seconds are engineering choices that worked well in our deployment and evaluation in an enterprise network. Each record in the local database is flagged once it has been uploaded to the system-wide repository. After a client reboot, only unflagged records are added to the queue for the system-wide repository.

Central Database

The system-wide repository 320 may be implemented on a server running Microsoft SQL Server 2005. This choice is well-suited for the operating scenario our prototype targets, namely better Web failure diagnosis in enterprise networks. The central database also allows administrators to manually troubleshoot problems, and yet does not alter user privacy since router or proxy logs contain similar information for successful transactions.

Due to the limited size of our evaluation testbed, our implementation does not include the communication overhead reduction techniques described above and instead shares the full complement of information.

Figure 19:
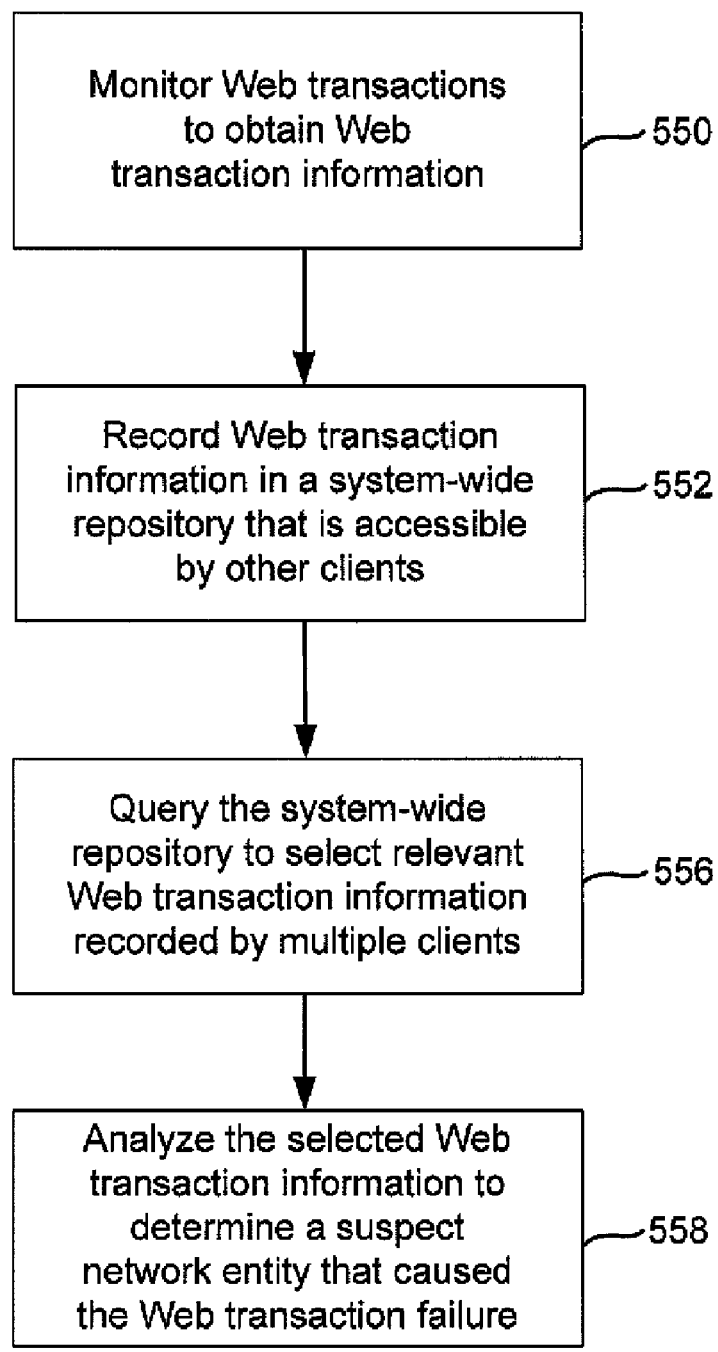
FIG. 19 is a flow chart of a WebProfiler process in accordance with an embodiment of the invention.

A top-level flow diagram of a process for cooperative diagnosis of Web transaction failures is shown in the flow chart of FIG. 19. Web transactions are monitored to obtain Web transaction information in act 550. As discussed above, the Web transaction information is acquired by a Web browser plug-in. The Web transaction information is recorded in a system-wide repository in act 552. The system-wide repository is available for recording, by a number of different clients, of Web transaction information. The system-wide repository thus contains Web transaction information from multiple clients. By recording Web transaction information from multiple clients, the ability to diagnose Web transaction failures is enhanced in comparison with diagnosing Web transaction information recorded by a single client.

Diagnosis of a Web transaction failure is based on the recorded Web transaction information. The diagnosis determines the cause of a Web transaction failure at a particular client. The diagnosis can be initiated automatically in response to a Web transaction failure or can be requested by a user. In the case of automatic diagnosis of Web transaction failures, the user or the administrator may receive alerts regarding selected diagnosis results or all diagnosis results. The diagnosis may be performed by WebProfiler diagnosis module 350 (FIG. 14). In the embodiment of FIG. 14, WebProfiler diagnosis module 350 is located in client devices 300 and 310. In other embodiments, WebProfiler diagnosis module 350 may be located in another network entity and diagnosis of a Web transaction failure may be performed at a network entity other than the client devices. For example, in enterprise networks, the network administrator may perform the diagnosis and the clients may not have access to the repository, except for recording of Web transaction information.

The system-wide repository is queried in act 556 by the WebProfiler diagnosis module to obtain selected Web transaction information recorded by the multiple clients. The Web transaction information is selected to provide information regarding the Web transaction failure. The selected Web transaction information is analyzed by the WebProfiler diagnosis module in act 558 to determine a suspect network entity that caused the Web transaction failure. The diagnosis utilizes the diagnosis algorithm shown in FIG. 16 and described above.

While the WebProfiler diagnosis technique is intended primarily for passive use, active measurements can be made under some circumstances. For example, a website that is frequently accessed may result in a large amount of Web transaction information being recorded in the repository, thus permitting an accurate diagnosis of Web transaction failures. However, a website that is seldom accessed may result in a small amount of Web transaction information being recorded in the repository, and the small amount of Web transaction information may be insufficient to effectively diagnose a Web transaction failure. In this case, a limited number of active measurements can be made to improve the accuracy of diagnosis. In particular, selected clients can automatically visit the seldom accessed website and record Web transaction information in the repository.

Enterprise Network Complexities

Our implementation considers several aspects, specific to enterprise networks, that add to the complexity of diagnosing web failures.

Corporate networks typically have firewalls at network edges to segregate intranet traffic from Internet traffic. IPSec authentication and encryption can further protect intranet traffic from un-authorized hosts and eavesdroppers. Hosts in the DMZ (de-militarized zone) between the firewalls and the public Internet, may be used for various purposes, including application testing.

In the intranet, which is segregated from the extranet, enterprise networks may use internal DNS servers. These servers resolve hostnames of internal machines only. Some may use special dynamic DNS protocols or WINS (Windows Internet Name Service) to allow internal machines with dynamic IP addresses to still have hostnames that persist across IP address changes.

HTTP proxies are typically deployed at the network edges to allow employees to access public Web content. These proxies provide performance advantages by caching popular content, and increase security by filtering malicious Internet content. Web browsers such as IE-7 and Firefox 2 automatically detect a proxy via the WPAD protocol, and will tunnel all requests for external Web content to the proxy. Some commercial products, such as Microsoft ISA (Internet Security and Acceleration), also provide socket proxy functionality. This allows non-HTTP applications, such as SSH, to access hosts on the Internet.

Each proxy hostname may resolve via WINS to one of several IP addresses, each corresponding to a separate proxy server. This provides load balancing and fault tolerance. Furthermore, large corporate intranets can stretch across the globe over private or leased links or tunnels. There may be proxies at the edge of the network in each location or city that the intranet covers. This provides users in New York to use the New York proxy that peers locally with US ISPs to access the Internet, instead of traveling over leased links to the London headquarters and then entering the Internet. These proxies can also be used to access intranet websites and thereby take advantage of caching.

WebProfiler handles these aspects of enterprise networks. Our plug-in collects information at the application layer so that we can operate even in IPSec environments. During URL resolution, it detects the use of internal hostname resolution such as WINS and captures the result or any error codes. The plug-in is able to detect which Web transactions went directly to the Web server or were tunneled through a proxy. It captures the name of the HTTP proxy, and also the specific IP address of the proxy used in that transaction. The WebProfiler service detects socket proxies, in case of tunneling underneath the browser.

Limitations

Although fully functional, our current prototype has certain limitations. If a Web server returns an error page in HTML, but without setting the corresponding HTTP error code, then IE-7 does not register an error, and, as a result, neither does our plug-in. Note that this is different from the case when a proxy returns a formatted error message; our plug-in successfully parses that because it contains an HTTP error code. In addition, certain Web pages use HTTP redirects in such a way that it appears as though the original requested page did rot load completely. For example, http://office.microsoft.com redirects to http://office.micorsoft.com/en-us/default.aspx, which then gets redirected again to itself. The problem is that the two redirects cause IE-7 to think a generic error has occurred. We encountered 5 such Web pages during our evaluation.

Even though our implementation is able to detect failures within sub-frames and for individual images, for evaluation purposes we only consider failures for the top-level frames of a Web page.

The prototype detects the use of a socket-level proxy by looking for the Microsoft ISA Firewall Client on the client machine. It can also parse HTML error pages returned from HTTP proxies that are running Microsoft ISA Server. While we have chosen to interface our prototype with these particular commercial proxy/firewall products, given the small amount of code that is specific to this choice, it is straightforward to extend it to include other alternatives.

Lastly, our prototype currently only works with IE-7 on the Windows is platform, including XP, Server 2003, Vista and Server 2008. However, we believe it would be straightforward to implement it for other common browsers. For example, Firefox exposes several rich APIs for extensions, and there are known ways to access browser events in Safari.
Extending WebProfiler to the Internet Certain characteristics of our current WebProfiler prototype, such as the centralized database server, make it better suited for deployment in an enterprise setting, where IT resources, which users have to trust anyway, are available to host the shared database. In this section, we discuss the applicability of and the new demands placed on our collaborative approach in a wide-area setting.
Decentralized Data Storage If participating clients are spread across multiple ISPs, a dedicated data storage infrastructure may not be available. A viable alternative is a decentralized, peer-to-peer design, where client hosts contribute storage and bandwidth to cooperatively implement the system-wide repository and support failure diagnosis. WebProfiler clients could utilize existing Distributed Hash Table (DHT) implementations to hold information (e.g., blame score) indexed by the identity of the entities involved.

Several DHT implementations exist (e.g., Chord, Kademlia, Pastry, Tapestry), each with its strengths and drawbacks. We particularly care about locality, for instance, to ensure that subnet-specific information remains within the subnet. One possibility is to use SkipNet, which provides controlled data placement to ensure locality. An alternative is to have multiple, distinct DHT "rings," e.g., at the level of the subnet, campus, and Internet, Each client would join the rings corresponding to its location and report relevant information into each ring.

Of course, realizing the system-wide repository over a peer-to-peer system entails other complications, such as dealing with nodes with relatively low availability, and with connectivity challenges due to NATs and firewalls. However, prior work on DHT replication and routing strategies in the face of high node churn could be leveraged to address these issues.
Security, Privacy, and Incentives Given our focus on enterprise networks, we have not described security and privacy issues. Corporations already watch user activities, and there is less concern about untrusted users providing incorrect information to WebProfiler. Such issues would have to be addressed in a wide-area scenario though. In particular, client observations should be anonymized by the service before being sent to the system-wide repository. For instance, for data shared within the campus ring, the client IP would be concealed, whereas for data shared across the Internet-wide ring, even the subnet should not be revealed.

Furthermore, the system should be resilient to malicious services that might send falsified records of client activity, attempting to throw off failure diagnosis. Given the volume of shared data, a voting scheme could arguably be devised to weed out any non-consistent information. In addition, no incentives are currently given to clients to contribute. As a result, a selfish client could just utilize the system for diagnosing its own failures, yet never contribute any information itself. However, there already exist effective techniques to enforce cooperation in a wide-area peer-to-peer storage system.

All of the references cited herein including patents, patent applications, and publications, are hereby incorporated in their entireties by reference.

In view of the many possible embodiments to which the principles of this invention may be applied, it will be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method of analyzing Web transaction failures in a network including a plurality of clients, comprising:
   monitoring, by a client computing device, Web transactions at the client computing device to obtain Web transaction information;
   recording, by the client computing device, the Web transaction information in a repository that is available for recording of Web transaction information by the plurality of clients;
   querying, by the client computing device, the repository to obtain selected Web transaction information recorded by some or all of the plurality of clients; and
   analyzing, by the client computing device, the selected Web transaction information recorded by some or all of the plurality of clients to determine at least one suspect network entity that caused a Web transaction failure, wherein analyzing the selected Web transaction information comprises:
   for each network entity involved in the Web transaction failure, retrieving a success count and a failure count;
   calculating a blame score for each network entity involved in the Web transaction failure as a ratio of the failure count to a sum of the success count and the failure count;
   determining if the blame score for each network entity involved in the Web transaction failure exceeds a first value determined by statistical analysis of blame scores of other network entities;
   if the blame score for a network entity exceeds said first value, adding the network entity to a set of suspect network entities that caused the Web transaction failure; and
   for at least selected pairs of network entities involved in the Web transaction failure, retrieving a success count and a failure count for a pair of network entities, calculating a blame score as a ratio of the failure count to the sum of the success count and the failure count for each pair of network entities involved in the Web transaction failure, determining if the blame score for each pair of network entities involved in the Web transaction failure exceeds a second value determined by statistical analysis of blame scores of other pairs of network entities, and if the blame score for the pair of network entities exceeds said second value, adding the pair of network entities to the set of suspects that caused the Web transaction failure.

2. A method as defined in claim 1, wherein recording the Web transaction information comprises updating success and failure counts for each network entity involved in a Web transaction.

3. A method as defined in claim 1, further comprising constructing a record for each Web transaction, the record containing the Web transaction information.

4. A method as defined in claim 1, further comprising performing active measurements by automatically accessing a selected website and recording in the repository Web transaction information related to the selected website.

5. A method as defined in claim 1, further comprising recording the Web transaction information in a local storage device associated with the client computing device.

6. A method as defined in claim 1, wherein determining if the blame score for each network entity exceeds said first value comprises retrieving a distribution of blame scores for all network entities of the same functional type as the network entity, and comparing the blame score with the blame score distribution.

7. A method as defined in claim 1, further comprising determining that a first suspect in the set of suspects is contained in a second suspect in the set of suspects, and removing the first suspect from the set of suspect network entities.

8. A computer-readable storage device encoded with instructions that, when executed by a computing device, perform a method as defined in claim 1.

9. A method for diagnosing a cause of a Web transaction failure, comprising:
for each network entity involved in the Web transaction failure, retrieving, by a client computing device, a success count and a failure count;
calculating, by the client computing device, a blame score as a ratio of the failure count to the sum of the success count and the failure count for each network entity involved in the Web transaction failure;
determining, by the client computing device, if the blame score for each network entity involved in the Web transaction failure exceeds a first value determined by statistical analysis of blame scores of other network entities;
if the blame score for a network entity exceeds said first value, adding, by the client computing device, the network entity to a set of suspects that caused the Web transaction failure; and
for at least selected pairs of network entities involved in the Web transaction failure, retrieving a success count and a failure count for a pair of network entities, calculating a blame score as a ratio of the failure count to the sum of the success count and the failure count for each pair of network entities involved in the Web transaction failure, determining if the blame score for each pair of network entities involved in the Web transaction failure exceeds a second value determined by statistical analysis of blame scores of other pairs of network entities, and if the blame score for the pair of network entities exceeds said second value, adding the pair of network entities to the set of suspects that caused the Web transaction failure.

10. A method as defined in claim 9, wherein determining if the blame score for each network entity exceeds said first value comprises retrieving a distribution of blame scores for all network entities of the same functional type as the network entity, and comparing the blame score with the blame score distribution.

11. A method as defined in claim 9, further comprising determining that a first suspect in the set of suspects is contained in a second suspect in the set of suspects, and removing the first suspect from the set of suspect network entities.

12. A computer-readable storage device encoded with computer-readable instructions that, when executed by a computing device, perform a method as defined in claim 9.

13. A computing device comprising:
a processor and a storage device encoded with instructions that, when executed by the processor, are configured to:
perform Web transactions in response to user requests;
monitor the Web transactions and to obtain Web transaction information representative of the Web transactions;
record the Web transaction information in a repository that is available for recording of Web transaction information by a plurality of Web clients; and
query the repository to obtain selected Web transaction information recorded by some or all of the plurality of Web clients and to analyze the selected Web transaction information to determine at least one suspect network entity that caused a Web transaction failure, including analyzing the selected Web transaction information by:
for each network entity involved in the Web transaction failure, retrieving a success count and a failure count;
calculating a blame score for each network entity involved in the Web transaction failure as a ratio of the failure count to a sum of the success count and the failure count;
determining if the blame score for each network entity involved in the Web transaction failure exceeds a first value determined by statistical analysis of blame scores of other network entities;
if the blame score for a network entity exceeds said first value, adding the network entity to a set of suspect network entities that caused the Web transaction failure; and
for at least selected pairs of network entities involved in the Web transaction failure, retrieving a success count and a failure count for a pair of network entities, calculating a blame score as a ratio of the failure count to the sum of the success count and the failure count for each pair of network entities involved in the Web transaction failure, determining if the blame score for each pair of network entities involved in the Web transaction failure exceeds a second value determined by statistical analysis of blame scores of other pairs of network entities, and if the blame score for the pair of network entities exceeds said second value, adding the pair of network entities to the set of suspects that caused the Web transaction failure.

14. A computing device as defined in claim 13, wherein determining if the blame score for each network entity exceeds said first value comprises retrieving a distribution of blame scores for all network entities of the same functional type as the network entity, and comparing the blame score with the blame score distribution.

* * * * *